(12) United States Patent
Xu et al.

(10) Patent No.: US 10,466,950 B2
(45) Date of Patent: Nov. 5, 2019

(54) CAMERA DRIVEN WORK FLOW SYNCHRONISATION

(71) Applicant: CANON KABUSHIKI KAISHA, Tokyo (JP)

(72) Inventors: Jie Xu, Eastwood (AU); Ij Eric Wang, Denistone (AU); Mark Ronald Tainsh, Pymble (AU)

(73) Assignee: Canon Kabushiki Kaisha, Tokyo (JP)

( * ) Notice: Subject to any disclaimer, the term of this patent is extended or adjusted under 35 U.S.C. 154(b) by 260 days.

(21) Appl. No.: 15/257,294

(22) Filed: Sep. 6, 2016

(65) Prior Publication Data

US 2017/0068499 A1    Mar. 9, 2017

(30) Foreign Application Priority Data

Sep. 8, 2015   (AU) .................................. 2015224396

(51) Int. Cl.
  *G06F 3/14*   (2006.01)
  *H04N 5/77*   (2006.01)

(52) U.S. Cl.
  CPC .............. *G06F 3/1423* (2013.01); *H04N 5/77* (2013.01); *G06F 3/1454* (2013.01)

(58) Field of Classification Search
  CPC ...... G06F 3/1423; G06F 3/1454; G11B 27/00; H04N 5/77
  See application file for complete search history.

(56) References Cited

U.S. PATENT DOCUMENTS

| | | | |
|---|---|---|---|
| 5,811,791 A | 9/1998 | Portman | |
| 6,005,613 A * | 12/1999 | Endsley | G06F 3/005 |
| | | | 348/231.6 |
| 6,343,314 B1 | 1/2002 | Ludwig et al. | |
| 6,397,192 B1 | 5/2002 | Notani et al. | |
| 7,240,324 B2 | 7/2007 | Casati et al. | |
| 7,930,268 B2 | 4/2011 | Starkey et al. | |
| 8,287,345 B2 | 10/2012 | Gross et al. | |
| 8,376,855 B2 | 2/2013 | Lockton et al. | |
| 8,615,517 B1 | 12/2013 | Vice et al. | |
| 8,661,523 B2 | 2/2014 | Barron et al. | |

(Continued)

FOREIGN PATENT DOCUMENTS

EP          0529317 B1    3/1993

*Primary Examiner* — Sejoon Ahn
(74) *Attorney, Agent, or Firm* — Canon U.S.A., Inc. IP Division

(57) ABSTRACT

A method of synchronizing a plurality of interactive display devices operating in accordance with a shared multi-step video production workflow, and in communication with a video capture device includes assigning a subset of the interactive display devices to a critical device group, with each such interactive display device being adapted to control operating parameters of the capture device. The method determines that each interactive display device in the critical device group has entered a recording step in the workflow and, in response enables a recording function of the video capture device to be activated by at least one of the video capture device and one of the interactive display devices in the critical device group. The method disables at least one user interface control in each of the plurality of interactive display devices in response to an activation of the recording function until the recording function is deactivated.

22 Claims, 15 Drawing Sheets

(56) References Cited

U.S. PATENT DOCUMENTS

| | | |
|---|---|---|
| 8,751,247 B1 | 6/2014 | O'Neil |
| 2002/0075160 A1 | 6/2002 | Racz et al. |
| 2003/0070178 A1 | 4/2003 | Boyd et al. |
| 2005/0027578 A1 | 2/2005 | Chambers et al. |
| 2005/0253817 A1* | 11/2005 | Rytivaara ............ G06F 3/04883 345/173 |
| 2007/0222859 A1* | 9/2007 | Chang .................... G08G 1/017 348/148 |
| 2011/0072037 A1* | 3/2011 | Lotzer ............... G06F 17/30855 707/769 |
| 2011/0162015 A1 | 6/2011 | Holyoake et al. |
| 2012/0004907 A1* | 1/2012 | Kulakcherla ....... G10L 21/0208 704/207 |
| 2012/0009896 A1* | 1/2012 | Bandyopadhyay ... G06F 1/1643 455/411 |
| 2012/0194419 A1* | 8/2012 | Osterhout .......... G02B 27/0093 345/156 |
| 2013/0057396 A1 | 3/2013 | Winslow |
| 2014/0074526 A1 | 3/2014 | Caudron |
| 2015/0019967 A1* | 1/2015 | Gutentag .............. H04W 76/10 715/719 |
| 2016/0255272 A1* | 9/2016 | Chin .................. H04N 5/23245 348/207.1 |
| 2017/0068499 A1* | 3/2017 | Xu ........................ G06F 3/1423 |
| 2017/0289443 A1* | 10/2017 | Nguyen ................ H04N 5/225 |

* cited by examiner

US 10,466,950 B2

CAMERA DRIVEN WORK FLOW SYNCHRONISATION

REFERENCE TO RELATED PATENT APPLICATION

This application claims the benefit under 35 U.S.C. § 119 of the filing date of Australian Patent Application No. 2015224396, filed Sep. 8, 2015, hereby incorporated by reference in its entirety as if fully set forth herein.

TECHNICAL FIELD

The present invention relates generally to cinematography and, in particular, to improvements in digital cinema.

BACKGROUND

The advent of digital imaging technology has altered the behaviour of the film industry, in the sense that more and more movies are produced digitally. Digital cinematography, being the process of capturing video content as digital content items, has become increasingly prevalent for film production.

In addition to simplifying the transition of source materials between production and post-production, digital cinematography has improved the work flow of production. Nevertheless, for example camera operators of digital cameras still rely on the assistant director's call-out to coordinate with the video recording. An issue with such coordination (communication) is that it may be restricted by relatively long distance between the distinct persons and their roles. Portable two-way radio communication (e.g. "walkie-talkies") may be employed to alleviate such a problem.

Given the complexity of onsite coordinating, it is desirable that camera operators can communicate with each other with minimum effort for the video production workflow.

SUMMARY

The present inventors consider it advantageous to allow camera operators to communicate with each other more efficiently by utilising the advantages of interactive display devices to aid preciseness and the reliability of communications. Disclosed are arrangements that synchronise multiple interactive display devices operating in accordance with a shared multi-step video production workflow and in communication with a video capturing device.

According to one aspect of the present disclosure, there is provided a processor implementable method of synchronising a plurality of interactive display devices operating in accordance with a shared multi-step video production workflow, and in communication with a video capture device, the method comprising:

assigning a subset of the plurality of the interactive display devices to a critical device group, each interactive display device in the critical device group being adapted to control operating parameters of the video capture device;

determining that each interactive display device in the critical device group has entered a recording step in the shared multi-step video production workflow and, in response to the determination, enabling a recording function of the video capture device to be activated by at least one of the group comprising: the video capture device and one of the interactive display devices in the critical device group; and disabling at least one user interface control in each of the plurality of interactive display devices in response to an activation of the recording function until the recording function is deactivated.

Desirably the method further comprises, upon activation of the recording function, restricting each of the plurality of interactive display devices to the recording step in the shared multi-step video production workflow. Advantageously the method may advance those ones of the plurality of interactive recording devices that are not in the recording step immediately before the activation to the recording step in the shared multi-step video production workflow.

Preferably, upon each interactive display device in the critical device group entering a recording step in the shared multi-step video production workflow, presenting an enabled recording function at at least one of the group comprising: the video capture device, and at least one of the interactive display devices in the critical device group.

In a specific implementation, an interactive display device is assigned to the critical device group based on previous operations of the interactive display device. Desirably the assigning comprises assigning all interactive display devices to a non-critical device group and observing recent operations of each device in the non-critical device group to determine if a device can be assigned to the critical device group and upon such assignment, removing the so assigned device from the non-critical device group.

Another arrangement further comprises displaying information content on the interactive display devices during activation of the recording function, the displayed information content being related to a role associated with the corresponding interactive display device. Desirably the displayed information is related to the role performed by the interactive display device immediately before commencement of the recording function.

In another example, the determining that each interactive display device in the critical device group has entered the recording step comprises checking a user interface control selected from the group consisting of a tab view, buttons, and a checklist.

Preferably, the disabling further comprises restricting a user interface of the camera during said activation of the record function.

In a specific implementation, the method further comprises polling a status of the camera to determine the activation of the recording function.

In another, the method further determines the activation of the recording function by receiving event notification from the camera.

According to another aspect, disclosed is an interactive display device comprising a processor, a memory coupled to the processor and including a program executable by the processor, and an interactive display arrangement, the program comprising code for performing a method of synchronising the interactive display device with at least one other interactive display device, each interactive display device operating in accordance with a shared multi-step video production workflow, and in being communication with a video capture device, the method comprising:

assigning a subset of the interactive display devices to a critical device group, each interactive display device in the critical device group being adapted to control operating parameters of the video capture device;

determining that each interactive display device in the critical device group has entered a recording step in the shared multi-step video production workflow and, in response to the determination, enabling a recording function of the video capture device to be activated by at least one of the group comprising: the video capture device and one of the interactive display devices in the critical device group; and disabling at least one user interface control in the interactive display arrangement of each of the interactive display devices in response to an activation of the recording function to thereby restrict each of the interactive display devices to the recording step in the shared multi-step video production workflow until the recording function is deactivated.

Preferably the interactive display device comprises the video capture device.

Another aspect includes a non-transitory computer readable storage medium having a program stored thereon, the program being executable to synchronise a plurality of interactive display devices operating in accordance with a shared multi-step video production workflow, and in communication with a video capture device, the program comprising:

code for assigning a subset of the plurality of the interactive display devices to a critical device group, each interactive display device in the critical device group being adapted to control operating parameters of the video capture device;

code for determining that each interactive display device in the critical device group has entered a recording step in the shared multi-step video production workflow and, in response to the determination, enabling a recording function of the video capture device to be activated by at least one of the group comprising: the video capture device and one of the interactive display devices in the critical device group; and code for disabling at least one user interface control in each of the plurality of interactive display devices in response to an activation of the recording function to thereby restrict each of the plurality of interactive display devices to the recording step in the shared multi-step video production workflow until the recording function is deactivated.

Desirably the storage medium further comprises code, operative upon activation of the recording function, to restrict each of the plurality of interactive display devices to the recording step in the shared multi-step video production workflow, and further comprising code for advancing those ones of the plurality of interactive recording devices that are not in the recording step immediately before the activation to the recording step in the shared multi-step video production workflow.

More preferably an interactive display device is assigned to the critical device group based on previous operations of the interactive display device, and the code for assigning comprises code for assigning all interactive display devices to a non-critical device group and observing recent operations of each device in the non-critical device group to determine if a device can be assigned to the critical device group and upon such assignment, removing the so assigned device from the non-critical device group.

Advantageously the code further comprises code for displaying information content on the interactive display devices during activation of the recording function, the displayed information content being related to a role associated with the corresponding interactive display device, the displayed information is related to the role performed by the interactive display device immediately before commencement of the recording function.

In another implementation the code for determining that each interactive display device in the critical device group has entered the recording step comprises code for checking a user interface control selected from the group consisting of a tab view, buttons, and a checklist. The code for disabling further comprises code for restricting a user interface of the camera during said activation of the record function. Preferably the code further comprises one of:

code for polling a status of the camera to determine the activation of the recording function; and code for determining the activation of the recording function by receiving event notification from the camera.

According to another aspect of the present disclosure, provided is a system comprising:

a communications network;

a video capture device coupled to the communications network;

a plurality of interactive display devices each coupled to the communications network and operating in accordance with a shared multi-step video production workflow in communication with the video capture device, the system being operable to:

assign a subset of the plurality of the interactive display devices to a critical device group, each interactive display device in the critical device group being adapted to control operating parameters of the video capture device;

determine that each interactive display device in the critical device group has entered a recording step in the shared multi-step video production workflow and, in response to the determination, enabling a recording function of the video capture device to be activated by at least one of the group comprising: the video capture device and one of the interactive display devices in the critical device group; and disable at least one user interface control in each of the plurality of interactive display devices in response to an activation of the recording function to thereby restrict each of the plurality of interactive display devices to the recording step in the shared multi-step video production workflow until the recording function is deactivated.

Other aspects are also disclosed.

BRIEF DESCRIPTION OF THE DRAWINGS

At least one embodiment of the present invention will now be described with reference to the following drawings, in which.

DETAILED DESCRIPTION INCLUDING BEST MODE

Context

Narrative films, which are probably the most widely screened films in theatres, are one type of film products that tell a story. The goal of narrative film making is to compose a sequence of events in audio and/or visual form based on a written (fictional or fictionalized) story. With the advent of digital imaging technology, digital cinematography which is referred to as the high-quality acquisition of video data using digital cinema cameras during film production, has become increasingly widespread for narrative film making. Similarly, digital cinematography is finding increasing application in other types of films, such as documentary films, examples of which include those based on pre-historic Earth and astronomical science.

Figure 1:
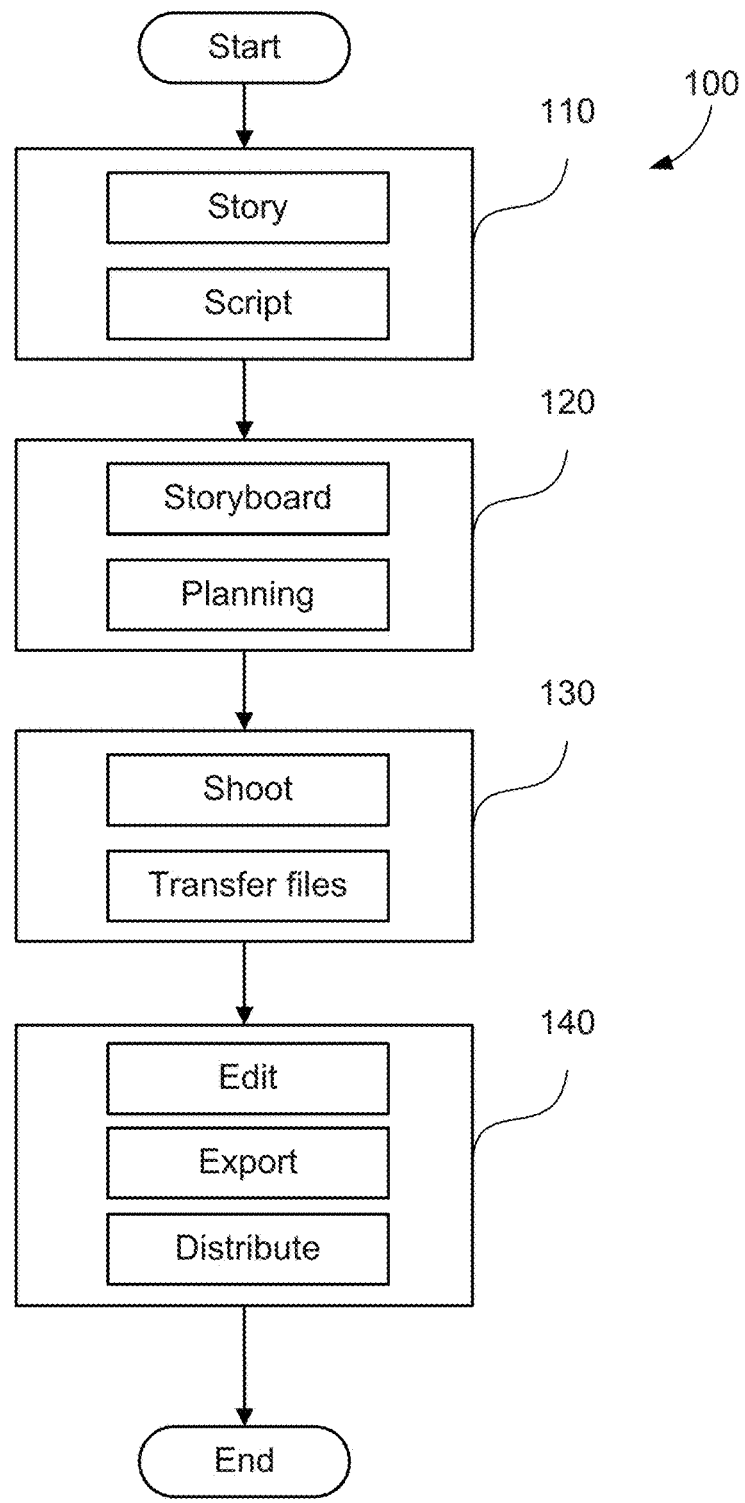
FIG. 1 shows a typical workflow in film production.

FIG. 1 illustrates a representative process 100 used in digital cinematography for narrative film and other types of film making. The method 100 mainly comprises the following stages: development 110, pre-production 120, production 130, and post-production 140. These are typically executed in sequence to produce the final film.

In the development stage 110, the film producer selects a story and develops a script with the help of a screenwriter. In the meantime, key elements such as financing, principal cast members, directors, and cinematographers are confirmed. In pre-production 120, storyboards, which are visual images helping communicating ideas for the script, are developed. Furthermore each step of actually making the film is meticulously designed and planned.

Following the pre-production is the production stage 130, in which raw footage for the film is generated. Specifically, shots, which are short recorded segments, are made for different scenes of the film. Shots are recorded using an video capture apparatus, such as a digital video camera. A shot is a basic unit of the production stage 130 corresponding to the continuous recording of a scene from the time the camera starts until it stops. It is common to capture multiple alternative versions for any given shot for any given scene. Each alternative shot captured is referred to as a take. Acquiring multiple takes for a given shot helps ensure there is footage of sufficient quality for use in post-production stage 140. Each take that is captured is stored with associated metadata relating to the captured video sequence.

Following the production stage 130 is the post-production stage 140. In the post-production stage 140, the captured content is edited and then exported to various formats such as Digital Versatile Disc (DVD), Blue-ray Disc™ (BD), Holographic Versatile Disc (HVD), etc. for distribution. The editing process of the post-production stage 140 consists of reviewing the content and assembling the film. Metadata created in the production stage 130 is utilized for editing at the post-production stage 140. For example, colour grading may be utilized to enhance or alter the colour of the acquired shots of a particular scene, in light of the cinematographer's or director's notes on colours.

Variations of the method 100 of FIG. 1 are possible in practice. However, film making typically employs pre-production (planning), production (capture) and post-production (editing) stages in some form.

At the production stage 130, a group of people is hired by the production company for the purpose of producing the film product. Such a group is often referred to as the film crew. The cast is another group of people hired for the film production comprising actors who appear in the film, or provide voices for characters in the film. A film crew can be partitioned into different departments such as camera department, art department, costume department, etc. Each of these departments includes technical experts that focus in one specific aspect of the film production. For example, a film director controls the artistic and dramatic aspects of the film by guiding the film crew and the cast in fulfilling the vision of the director. A script supervisor oversees the continuity of the video production which includes props, set dressing, makeup and the actions of the actors during a scene. A camera operator, also called a cameraman, is responsible for operating the video camera to maintain composition and camera angles throughout a given scene or shot. The leading camera operator is often called the cinematographer. A focus puller, or $1^{st}$ assistant camera, also operates the video camera to maintain image sharpness on the subject or action being filmed.

Figure 2A:
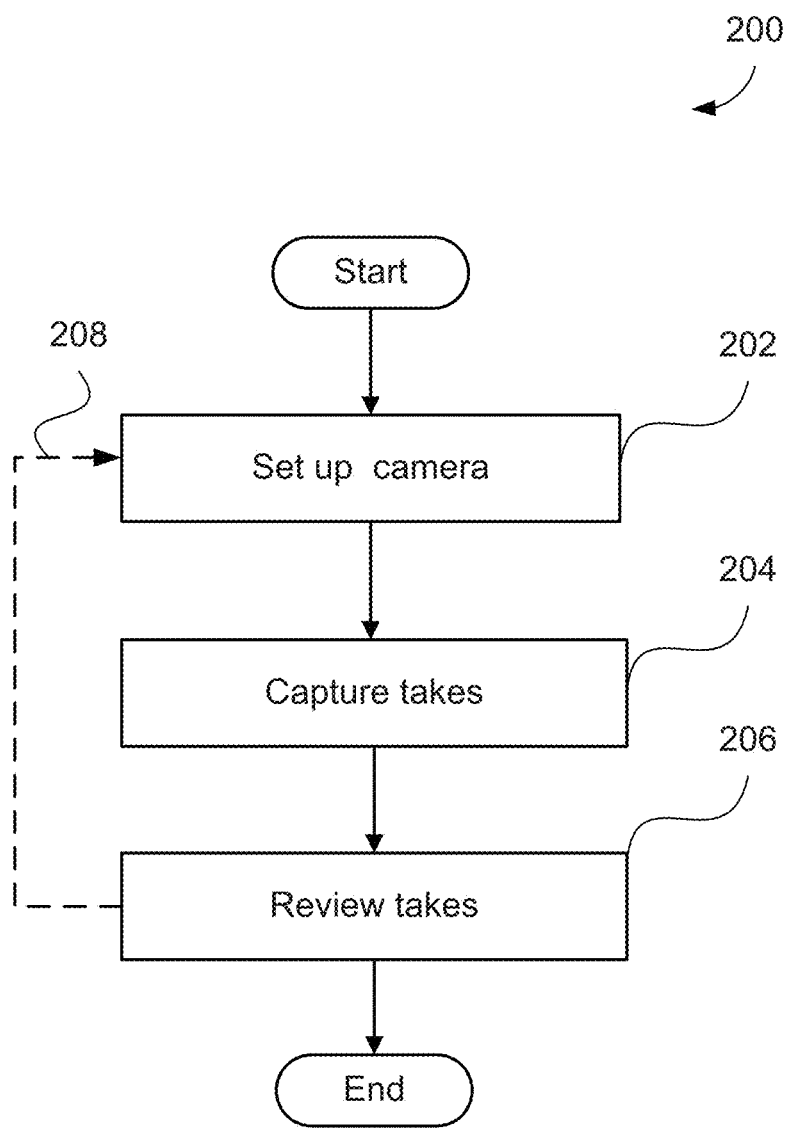
FIG. 2A shows a flowchart affording an overview of the iterative process of typical video production.

The process of producing video in the production stage 130 is highly iterative, consisting of multiple steps. As depicted in FIG. 2A, a typical video production process 200 includes the following steps: setting up camera 202, capturing takes 204, and reviewing takes 206. At the camera setup step 202, camera operators ensure the one or more cameras to be used for video scene capture and their associated equipment are rigged and ready for the required set-up. At the step of take capturing 204, camera operators receive instructions from the film director and cinematographer, which may include where to position the camera, how to frame shots, and how to move the camera, amongst others. Camera operators are responsible to translate those instructions into carefully framed and composited takes. At the review step 206, the director generally reviews the captured takes and the script supervisor records notes in report sheets. These notes may include possible issues or general comments on the takes. The process 200 is iterative, indicated by the return line 208, in that the review step 206 may require that the shot be re-captured, for example following a revised camera setup 202.

The assistant director supports such an iterative multi-step video production by coordinating with different departments. The role of an assistant director includes tracking daily progress of the overall production, arranging logistics, maintaining orders on the set, and other tasks. One typical job of the assistant director is to "call to roll", which means to call out a series of specific cues for each take. The purpose of the call-out is to ensure that all cast and crew on set are aware of what exactly is going on so that they can perform their role at the appropriate moment. Over the years, special procedures to achieve maximum productivity have been developed. For example, the call-out of "Quiet on the set" means that the take is ready and imminent, and that everyone should be alerted for the next step; the call-out of "Turnover" signals both the camera and sound department to start rolling, which means that they will confirm that the recording equipment is running with correct parameters set; the call-out of "Action" usually means the start of recording, which is often executed by either the assistant director or the director, depending on the director's presence. Generally immediately after "Action" is called, a clapperboard device (or slate) is operated in the shot. The clapperboard device has two primary applications or roles—to assist in synchronising of picture and sound, and to contain information about the shot being recorded. The information about the shot being recorded typically conveys (a) production specific information such as date and time, production title, name of the director, name of director of photography (DOP), and (b) shot specific information such as scene, shot, take, timecode.

Before the actual recording starts, camera operators listen to the call-out of the assistant director to coordinate with each other to set and run the cameras properly. An issue with such coordination is that, it may be restricted by long distance. Walkie-talkies may be employed to alleviate such a problem.

With the advent of digital cinematography, more and more people are accessing the digital video camera remotely via wireless or wired networks. This ensures the camera remains a centre of importance in the era of digital cinematography. Modern digital video cameras may support remote operations such as retrieving/updating camera settings (ISO values, shutter speed, aperture sizes, colour temperature, focus distance), selecting recording slots, starting/stopping recording, enabling/disabling live view, entering metadata such as slate, location and time information, etc. All of these operations may be considered as critical operations.

This disclosure describes new approaches for supporting the multi-step video production process by taking advantages of interactive display devices and digital video cameras. The approaches employ interactive display devices to engage crew members with video production. The interactive display devices are capable of accepting and responding to inputs in a visual and interactive manner, and are superior to walkie-talkies in terms of ensuring preciseness and the reliability of the communication.

Examples of the interactive display devices include, but are not limited to, tablet devices, touchscreen cameras, smart phones, etc. These devices may support on-set monitoring and camera controlling by communicating with the video camera via a wireless network. One example is wireless on-set monitoring to a tablet device, such as an iPad™ (Apple Inc. of California), using wireless video transmitter, such as a Teradek Cube™ (Teradek, LLC, of California). The Teradek Cube™ and the iPad™ can connect to the same communications network, e.g. a Wi-Fi (IEEE 802.11) network, and communicate via the communication network. Once the Teradek Cube™ has been connected to the camera via a connection such as a HDMI/HD-SDI connection, the Teradek Cube™ transmits live video (live capture of takes) from the camera to the iPad™ device via the network with little appreciable delay. This arrangement allows effective live (real-time) monitoring of the take on the iPad™ device and also supports the communication between camera operators. Typically control communications may be provided via the network to the camera, and the operation of the Teradek Cube™ is limited for video broadcast. In other implementation, the ability for wireless video broadcast may be configured within the camera, as part of a Wi-Fi communications arrangement thereby permitting control and video streaming via a common system.

Structural Configuration

Figure 2B:
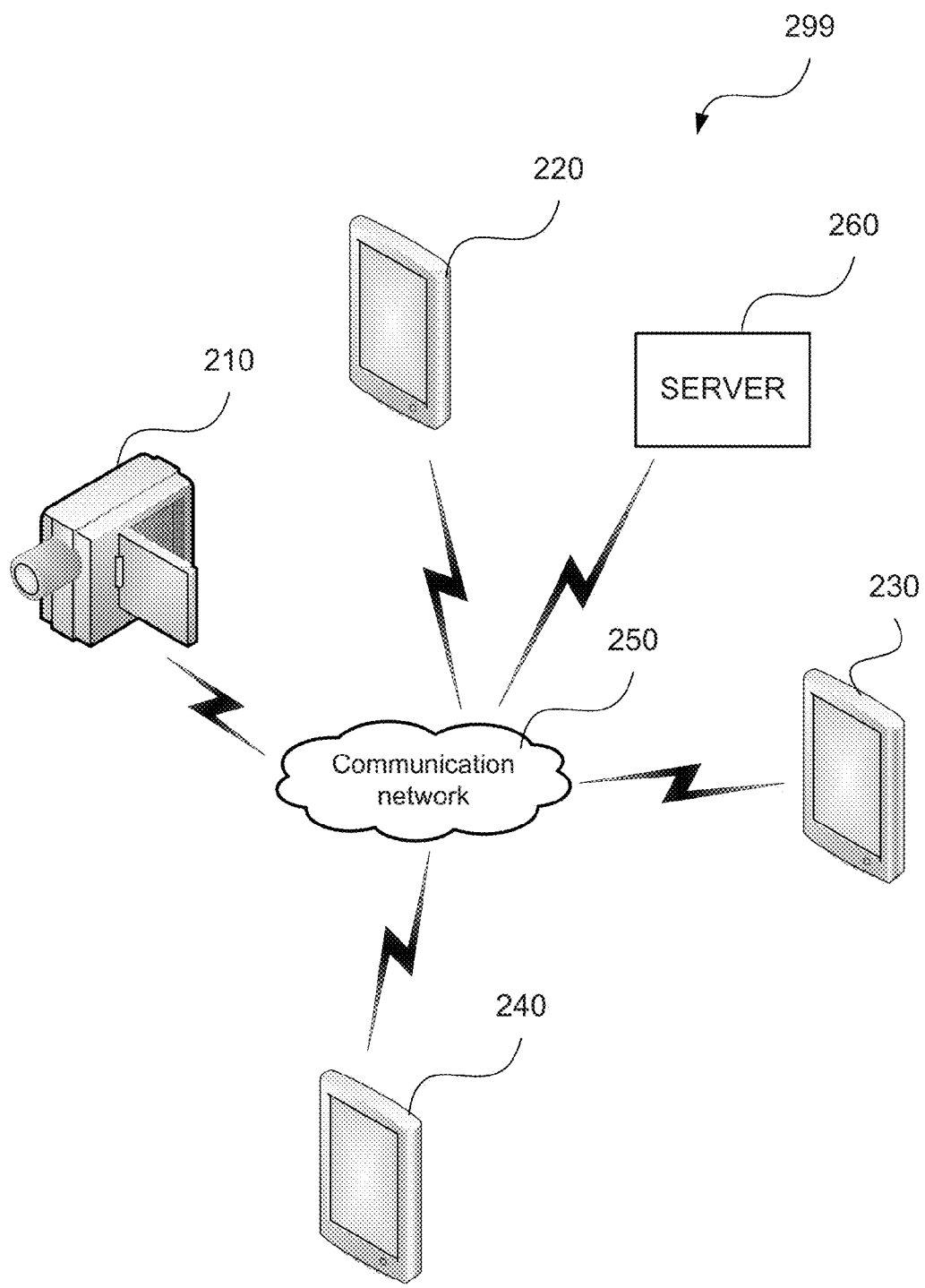
FIG. 2B shows a schematic representation of a system upon which the presently disclosed arrangements may be practised.

FIG. 2B illustrates a system 299 upon which the arrangements presently disclosed can be practised. A video camera 210 communicates with three interactive display devices 220, 230, and 240 such as iPad™ devices via a wireless communication network 250, which may for example utilizes the Teradek Cube™ (not illustrated in FIG. 2B) for video streaming from the camera 210 to the network 250. The wireless network 250 may include but is not limited to Wi-Fi, and Long-Term Evolution (LTE) networks. Also illustrated in FIG. 2B is a server computer 260 which may form part of the system 299 and which may be configured to perform management tasks in the system 299 for overall coordination between the other various devices. In some implementations, the "server" role may be performed by any one of the interactive display devices 220-240, or even the camera 210 when so configured.

Due to the capability of producing voluminous amount of digital content, the data security of the camera has become more and more vital. To safeguard the data of the camera, different permissions are granted to different groups of interactive display devices. The device group that has been endowed with the rights to execute abovementioned critical operations, such as starting/stopping camera recording, is considered as a critical device group. For video production, all the interactive display devices associated with camera operators may be considered as members of a critical device group, for the reason that the recording may only begin when all camera operators are ready.

Figure 11A:
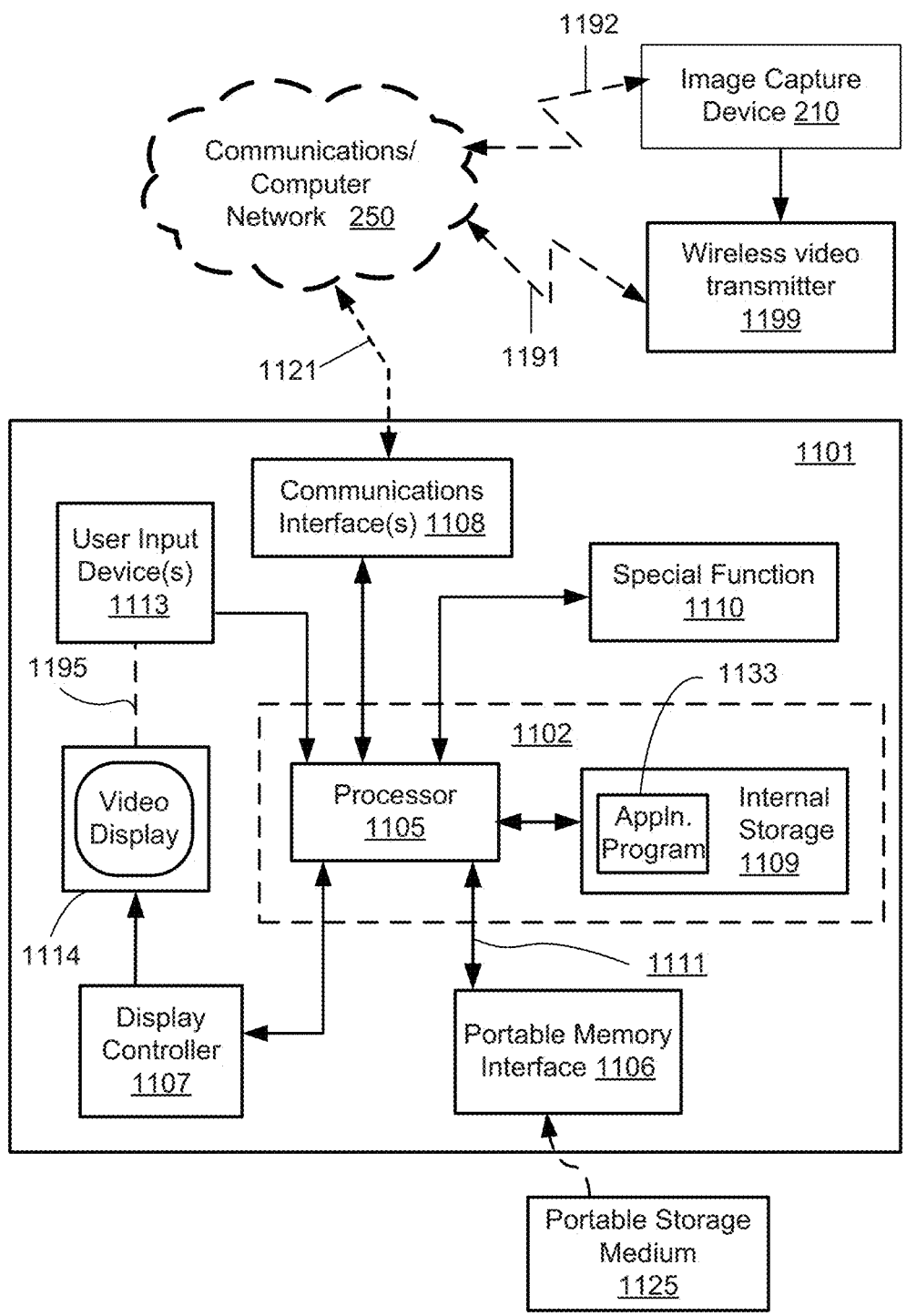
FIGS. 11A and 11B collectively form a schematic block diagram representation of an electronic device upon which described arrangements can be practised.
Figure 11B:
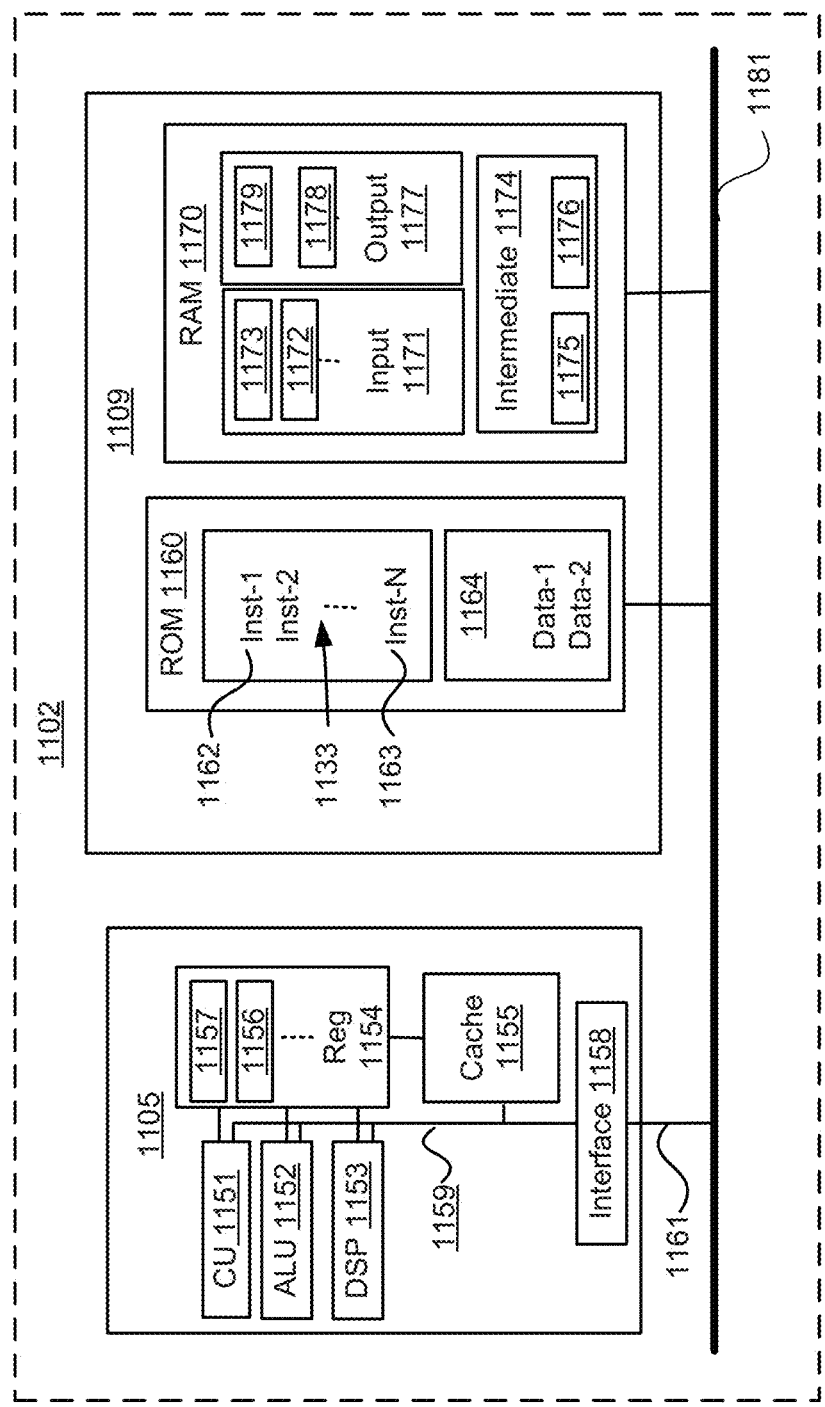

The methods to be described are typically and preferably implemented using at least one portable interactive electronic display device, such as a tablet device, a smartphone, or the like, having a display suited to real-time video reproduction. FIGS. 11A and 11B collectively form a schematic block diagram of a general purpose electronic device 1101 including embedded components, upon which the methods are desirably practiced. In a preferred implementation the electronic device 1101 is a portable interactive tablet device having a touch-screen display akin to the tablet devices 220-240 of FIG. 2B. However, in other implementations the electronic device 1101 may be another type of electronic device in which processing resources are generally limited, for example a mobile phone, a portable media player, or a smartphone, or an electronic image capture apparatus such as a camera or video camera. Nevertheless, as indicated above the methods to be described may also be performed on higher-level interactive display devices such as desktop computers, server computers, and other such devices with generally significantly larger processing resources and via which interactive display arrangements may be formed with input devices such as pointers, mice, touch panels and the like.

As seen in FIG. 11A, the device 1101 comprises an embedded controller 1102. Accordingly, the device 1101 may be referred to as an "embedded device." In the present example, the controller 1102 has a processing unit (or processor) 1105 which is bi-directionally coupled to an internal storage module 1109. The storage module 1109 may be formed from non-volatile semiconductor read only memory (ROM) 1160 and semiconductor random access memory (RAM) 1170, as seen in FIG. 11B. The RAM 1170 may be volatile, non-volatile or a combination of volatile and non-volatile memory.

The device 1101 includes a display controller 1107, which is connected to a video display 1114, such as a liquid crystal display (LCD) panel or the like. The display controller 1107 is configured for displaying bitmap and graphical images on the video display 1114 in accordance with instructions received from the embedded controller 1102, to which the display controller 1107 is connected.

The device 1101 also includes user input devices 1113 which are typically formed by keys, a keypad or like controls. In the example described herein, the user input devices 1113 includes a touch sensitive panel physically associated with the display 1114, as depicted by the dashed line 1195, to collectively form a touch screen. For ease of reference, the combination of the display 1114 and the user input devices 1113 are referred to as a touch screen 1114 in the arrangements described, consistent with that type of structure as found in traditional tablet devices, such as the Apple iPad™. The touch screen 1114 may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 11A, the device 1101 also comprises a portable memory interface 1106, which is coupled to the processor 1105 via a connection 1111. The portable memory interface 1106 allows a complementary portable memory device 1125 to be coupled to the tablet device 1101 to act as a source or destination of data or to supplement the internal storage module 1109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The device 1101 also has a communications interface 1108 to permit coupling of the device 1101 to a computer or the communications network 250 via a connection 1121. The connection 1121 may be wired or wireless. For example, the connection 1121 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like. In the preferred implementations, the communications interface operates according to Wi-Fi standards.

In some instances, the device 1101 is configured to perform some special function. The embedded controller 1102, possibly in conjunction with further special function components 1110, is provided to perform that special function. For example, where the device 1101 is a digital camera, the components 1110 may represent a lens, focus control and image sensor of the camera. The special function components 1110 is connected to the embedded controller 1102. As another example, the device 1101 may be a mobile telephone handset. In this instance, the components 1110 may represent those components required for communications in a cellular telephone environment. Where the device 1101 is a portable device, the special function components 1110 may represent a number of encoders and decoders of a type including Joint Photographic Experts Group (JPEG), (Moving Picture Experts Group) MPEG, MPEG-1 Audio Layer 3 (MP3), and the like. The special function components 1110 may also relate to operation of the touch screen 1114.

The methods described hereinafter may be implemented using the embedded controller 1102, where the processes of FIGS. 2A to 10 may be implemented as one or more software application programs 1133 executable within the embedded controller 1102. The device 1101 of FIG. 11A implements the described methods. In particular, with reference to FIG. 11B, the steps of the described methods are effected by instructions in the software 1133 that are carried out within the controller 1102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 1133 of the embedded controller 1102 is typically stored in the non-volatile ROM 1160 of the internal storage module 1109. The software 1133 stored in the ROM 1160 can be updated when required from a computer readable medium or via communication with a server computer such as a cloud computer. The software 1133 can be loaded into and executed by the processor 1105. In some instances, the processor 1105 may execute software instructions that are located in RAM 1170. Software instructions may be loaded into the RAM 1170 by the processor 1105 initiating a copy of one or more code modules from ROM 1160 into RAM 1170. Alternatively, the software instructions of one or more code modules may be pre-installed in a non-volatile region of RAM 1170 by a manufacturer. After one or more code modules have been located in RAM 1170, the processor 1105 may execute software instructions of the one or more code modules.

The application program 1133 is typically pre-installed and stored in the ROM 1160 by a manufacturer, prior to distribution of the tablet device 1101. However, in some instances, the application programs 1133 may be supplied to the user encoded on one or more CD-ROM (not shown) and read via the portable memory interface 1106 of FIG. 11A prior to storage in the internal storage module 1109 or in the portable memory 1125. In another alternative, the software application program 1133 may be read by the processor 1105 from the network 250, or loaded into the controller 1102 or the portable storage medium 1125 from other computer readable media. Computer readable storage media refers to any non-transitory tangible storage medium that participates in providing instructions and/or data to the controller 1102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 1101. Examples of transitory or non-tangible computer readable transmission media that may also participate in the provision of software, application programs, instructions and/or data to the device 1101 include radio or infra-red transmission channels as well as a network connection to another computer or networked device, and the Internet or Intranets including e-mail transmissions and information recorded on Websites and the like. A computer readable storage medium having such software or computer program recorded on it is a computer program product.

The second part of the application programs 1133 and the corresponding code modules mentioned above may be executed to implement one or more graphical user interfaces (GUIs) to be rendered or otherwise represented upon the display 1114 of FIG. 11A. Through manipulation of the user input device 1113 (e.g., the keypad or touch screen), a user of the device 1101 and the application programs 1133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 11B illustrates in detail the embedded controller 1102 having the processor 1105 for executing the application programs 1133 and the internal storage 1109. The internal storage 1109 comprises read only memory (ROM) 1160 and random access memory (RAM) 1170. The processor 1105 is able to execute the application programs 1133 stored in one or both of the connected memories 1160 and 1170. When the tablet device 1101 is initially powered up, a system program resident in the ROM 1160 is executed. The application program 1133 permanently stored in the ROM 1160 is sometimes referred to as "firmware". Execution of the firmware by the processor 1105 may fulfil various functions, including processor management, memory management, device management, storage management and user interface.

The processor 1105 typically includes a number of functional modules including a control unit (CU) 1151, an arithmetic logic unit (ALU) 1152, a digital signal processor (DSP) 1153 and a local or internal memory comprising a set of registers 1154 which typically contain atomic data elements 1156, 1157, along with internal buffer or cache memory 1155. One or more internal buses 1159 interconnect these functional modules. The processor 1105 typically also has one or more interfaces 1158 for communicating with external devices via system bus 1181, using a connection 1161.

The application program 1133 includes a sequence of instructions 1162 through 1163 that may include conditional branch and loop instructions. The program 1133 may also include data, which is used in execution of the program 1133. This data may be stored as part of the instruction or in a separate location 1164 within the ROM 1160 or RAM 1170.

In general, the processor 1105 is given a set of instructions, which are executed therein. This set of instructions may be organised into blocks, which perform specific tasks or handle specific events that occur in the tablet device 1101. Typically, the application program 1133 waits for events and subsequently executes the block of code associated with that event. Events may be triggered in response to input from a user, via the user input devices 1113 of FIG. 11A, as detected by the processor 1105. Events may also be triggered in response to other sensors and interfaces in the tablet device 1101.

The execution of a set of the instructions may require numeric variables to be read and modified. Such numeric variables are stored in the RAM 1170. The methods described use input variables 1171 that are stored in known locations 1172, 1173 in the memory 1170. The input variables 1171 are processed to produce output variables 1177 that are stored in known locations 1178, 1179 in the memory 1170. Intermediate variables 1174 may be stored in additional memory locations in locations 1175, 1176 of the memory 1170. Alternatively, some intermediate variables may only exist in the registers 1154 of the processor 1105.

The execution of a sequence of instructions is achieved in the processor 1105 by repeated application of a fetch-execute cycle. The control unit 1151 of the processor 1105 maintains a register called the program counter, which contains the address in ROM 1160 or RAM 1170 of the next instruction to be executed. At the start of the fetch execute cycle, the contents of the memory address indexed by the program counter is loaded into the control unit 1151. The instruction thus loaded controls the subsequent operation of the processor 1105, causing for example, data to be loaded from ROM memory 1160 into processor registers 1154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 1133, and is performed by repeated execution of a fetch-execute cycle in the processor 1105 or similar programmatic operation of other independent processor blocks in the tablet device 1101.

As seen in FIG. 11A, the (tablet) device 1101 is configured for communication with the image capture apparatus 250 via a connection 1121 to the network 230. In this specific example, the image capture apparatus 250 is shown interfaced to the network 230 via a wireless video transmitter 1199, such as the Teradek Cube™ device mentioned above, which forms an interconnection 1191. More generally, the image capture apparatus 210 may have a wireless (e.g. WiFi) connection 1192 direct to the network 250 via which control and status signals may be exchanged, and the connection 1191 via the wireless transmitter 1899 may be used essentially exclusively for streaming video signals from the capture apparatus 210 to the network 250. In some implementations, the wireless video transmitter 1899 may be integrated with the image capture apparatus 210 and a single wireless connection (perhaps with multiple channels) with the network 250 may be established.

Figure 8A:
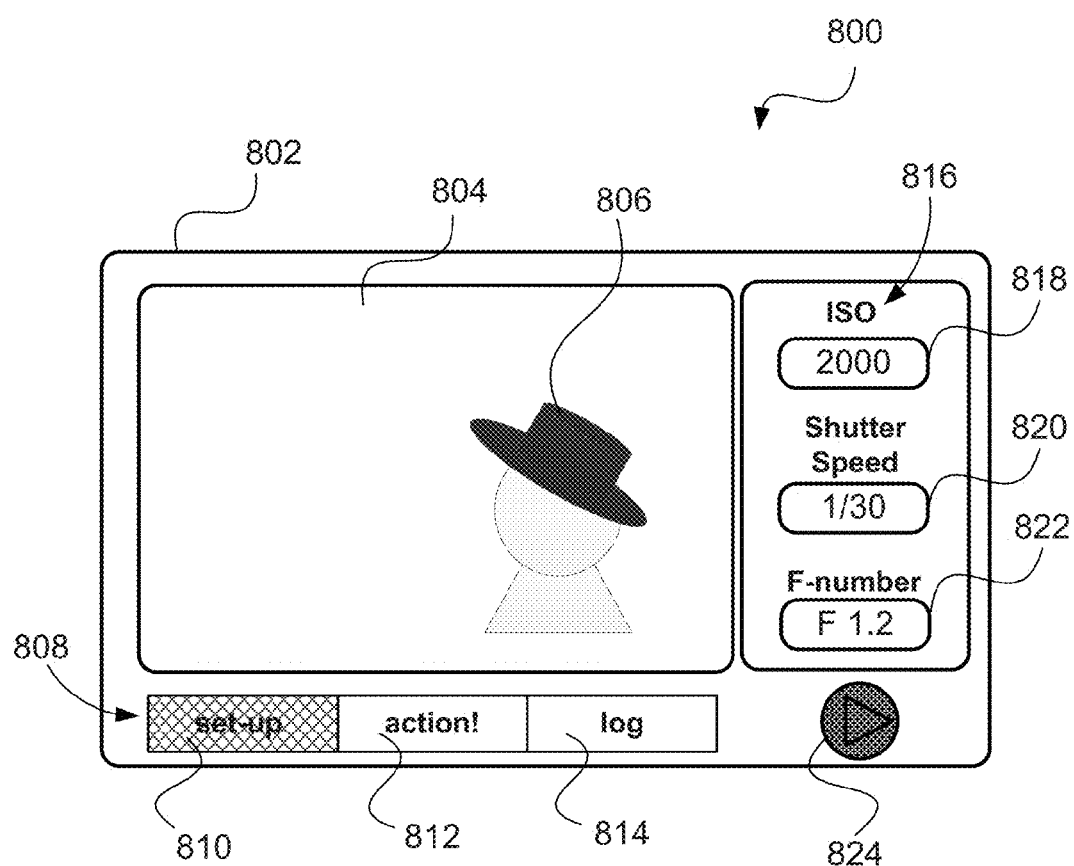
FIG. 8A depicts a user interface for an interactive mobile device with disabled recording function.

It is useful to implement a multi-step video production workflow synchronisation operation determined by the status of critical device group, due to its convenience for coordination and also the guarantee of data security. FIG. 8A depicts an exemplary graphical user interface (GUI) 802 for one device 800 of the multiple of interactive mobile devices 220-240 associated with the video camera 210. The devices 220-240 can be synchronised for a multi-step video production workflow. As shown in FIG. 8A, the user interface 802 contains the following components: a live view screen 804, a multi-step workflow indicator 808, a camera setting panel 816, and a recording button 824. The live view screen 804 shows what the camera 210 sees in real time, which in this example is currently a man wearing a hat 806. The multi-step video production workflow indicator 808 depicts three tabs corresponding to the following steps respectively: setting up camera 810, performing camera action 812, and logging 814. At the moment depicted in FIG. 8A, the setup tab 810 is active permitting the device operator to adjust the camera settings. In the camera setting panel 816, the device operator can change the following parameters for the camera: ISO 818, shutter speed 820, and F-number 822. The iconic button on the bottom right corner of the GUI 802 is the recording button 824, which can be manipulated by the device operator to activate the recording. At the moment depicted in FIG. 8A the recording button 824 is presented in a disabled state since not all devices in the critical device group have moved to the recording step yet.

Establishing Network Communication

Figure 3:
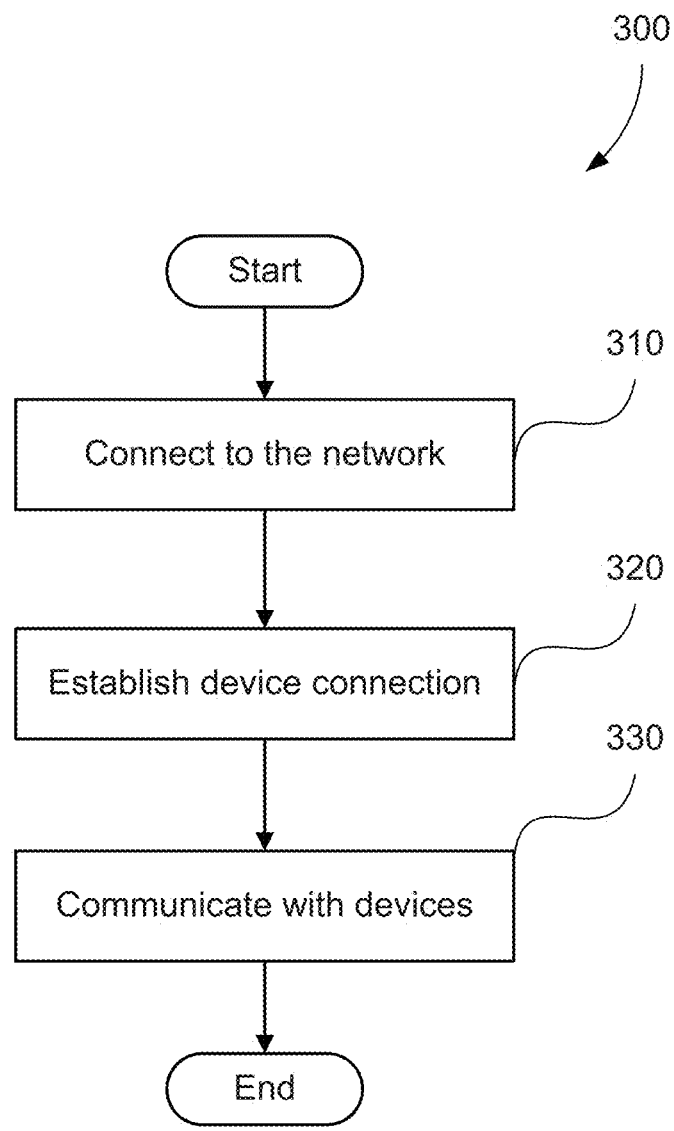
FIG. 3 is a flowchart of a process upon which an interactive display device establishes network communication with a camera.

FIG. 3 depicts a process 300 upon which an interactive display device may start the network communication with the video camera 210 and other interactive display devices 220, 230, 240 as shown in FIG. 2B. The process 300 is typically implemented in software as a component of the application program 1133 of the corresponding interactive touch panel device 220-240 (1101).

Before initiating the device-camera and peer-device communication, an interactive display device 1101 may connect to the communication network 250 at step 310. In one implementation, the communication network 250 is a wireless network generated based on the IEEE 802.11 standards, which is more commonly known as Wi-Fi or Wireless Local Area Network (WLAN). Such a wireless network is often implemented using a wireless router which sends out Wi-Fi signals. The interactive display device 1101 identifies the wireless signal for the network 250 based on the given Service Set Identifier (SSID). A password may be required for the connection depending on the security protocol employed by the network 250.

Once the interactive display device 1101 has connected to the network 250, the process 300 proceeds to step 320 which establishes connections between the device 1101 and each of the video camera 210 and other ones of the peer devices 220, 230, 240, thereby establishing peer-to-peer connections. The connection to the camera 210 maybe via wireless video transmitter 1199 (Teradek Cube™ device) for video transmission, and via Canon Wireless File Transmitter (WFT) for command transmission. In another example, the camera may be embedded with hardware implementations of both the video transmitter and file transmitter.

To allow the connection with the video camera 210, the camera 210 may provide an Application Programming Interface (API) which allows interactive display devices to control the camera 210 and retrieve camera status information from the camera 210. On example of the camera status is a recording status that indicates whether the video camera 210 is recording a video sequence or not. The API may support network protocols such as File Transfer Protocol (FTP), Precision Time Protocol (PTP), and also Hypertext Transfer Protocol (HTTP). In one implementation, the interactive device 1101 may establish the connection with the camera by opening a Transmission Control Protocol/Internet Protocol (TCP/IP) socket connection based on the pre-configured Internet Protocol (IP) address of the camera 210. In another example, the video camera 210 may support some automatic IP address discovery mechanism for establishing the connection.

The establishment of the peer connection with other devices involves peer discovery. In one embodiment, the device 1101 (e.g. 220) may use an automatic peer discovery mechanism for discovering peer devices (e.g. 230, 240) in the communications network 250. One example of such mechanism is Bonjour™ technology developed by Apple Inc. Bonjour™ technology is a group of technologies that includes service discovery, address assignment, and hostname resolution. In a typical process of establishing connection with Bonjour™ technology, each peer device starts by advertising its presence on the communications network as a service. The service typically contains information that can uniquely identify a type of the service. Then each peer device starts searching on the communications network 250 for available Bonjour™ services that correspond to other peer devices. Hostname resolution technology allows determining IP address of identified peer devices.

In another implementation, each device may be manually configured via the user interface with the list of IP addresses of peer devices. In yet another alternative implementation, each device may be configured to establish a connection to a webserver, such as the server 260, and the webserver can provide a list of IP addresses of the peer devices connected to the communications network.

After the device-camera and peer-device connections have been established in step 320, the process 300 proceeds to step 330, where the interactive display device 1101 (e.g. 220) communicates with the video camera 210 and also other peer devices (e.g. 230, 240).

The communication between the interactive display device and the video camera includes video and control signals. In one implementation, the video camera 210 is capable of streaming live video to the communication network 250. In an alternative arrangement, the video camera 210 may not be capable of streaming video to the communication network 250 directly, in such a case a separate device may be used that is able to capture the video output from the video camera 210 and stream the video sequence over the communication network 250. One example of such a device is the abovementioned Teradek Cube™. The video camera 210 may also provide an Application Programming Interface (API), through which client devices can control the video camera 210 and request the status of the video camera 210. One example of the camera status is a recording status that indicates whether the video camera 210 is recording a video sequence or not.

Once the IP addresses of peer devices are acquired, the device 1101 (e.g. 220) establishes connection (step 320) to each of the peer devices by opening a TCP/IP socket connection. In one example, Extensible Messaging and Presence Protocol (XMPP) communication protocol is used to exchange arbitrary data between peers. XMPP is an Extensible Markup Language (XML) based protocol that enables the near-real-time exchange of data between any two or more network entities. Thus each interactive display device 1101 (e.g. 220) has a list of one or more peer devices (e.g. the camera 210, and the interactive display devices 230, 240) connected to the communications network 250 and is able communicate to those peer devices (step 330).

Significantly, during the process 300, individual peer devices are able to be identified by assignment to certain groups of such devices, such as a critical device group associated with the actual operation of the camera 210. Accordingly for example, the devices 220, 230 and 240 of FIG. 2B may be each established in their connections to the network 250 as part of the camera critical device group and thus each possesses an authority to manipulate operation of the camera 210. This may be distinct from other interactive display devices (not illustrated), for example one operated by a member of the makeup department who may be able to received streamed live video from the camera 210 via the network 250, but would not have permission to control the camera 210.

Altering Video Recording Function

Figure 4:
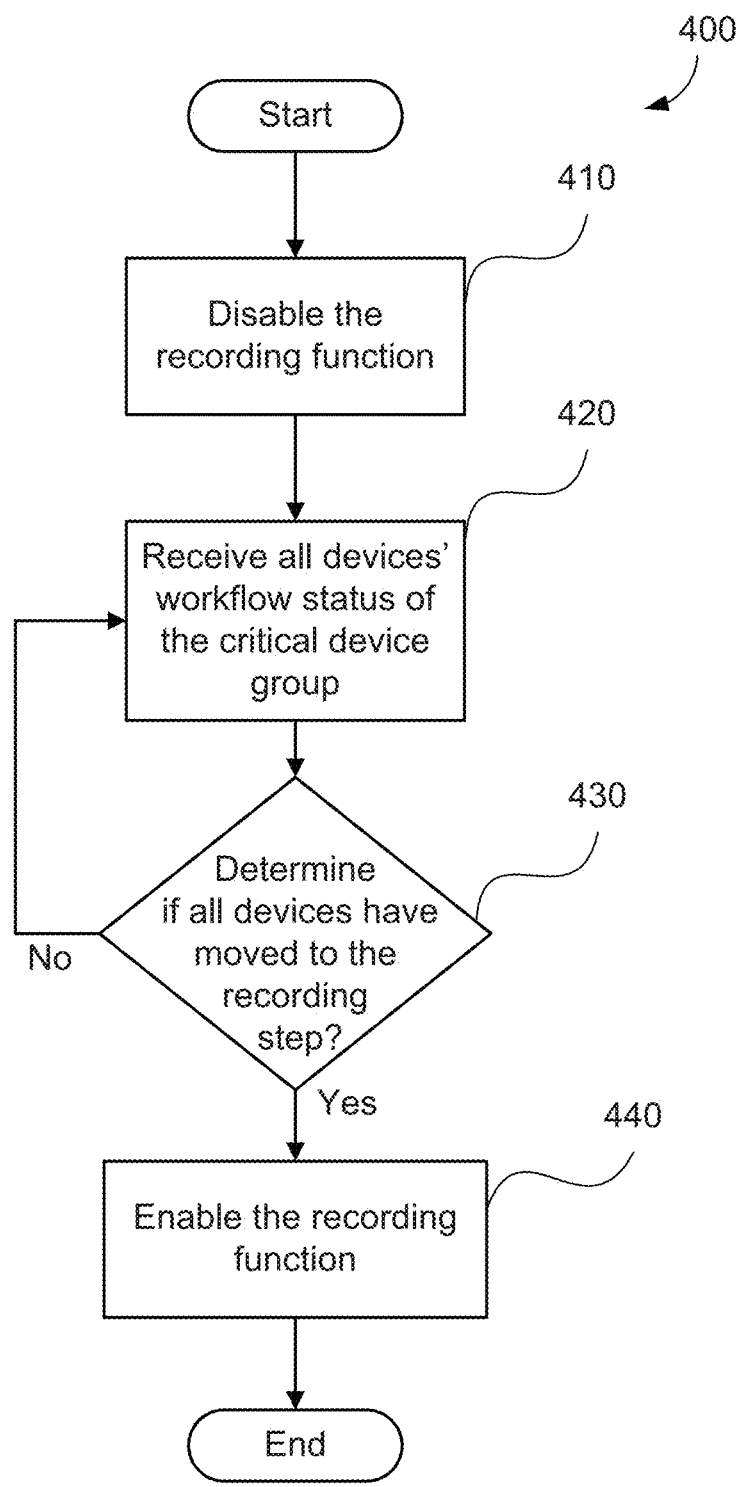
FIG. 4 is a flowchart of a process of altering the video recording function based on the workflow status of the critical device group.

FIG. 4 illustrates the process 400 for altering the video recording function based on the workflow status of the critical device group. The process 400 is typically implemented in software as part of the application 1133 on each of the interactive display devices 1101 of the critical device group to thereby allow those devices to appropriately coordinate their collective operation of the camera 210. Initially, at step 410, the recording function is disabled on the interactive display device 1101. This operation prevents the start of recording without all of the critical devices being ready. The disabling of the recording function can be implemented in a number of ways. In one implementation, the recording function is presented in a disabled state on all interactive display devices 220, 230, 240. For example, the presentation may involve hiding the recording function interface control (the button 874), or reducing the opacity of corresponding interface control 874, etc. The presentation of a disabled recording function on any one device may nevertheless mean that the recording function is still enabled on the video camera 210. In another implementation, the disabling and enabling of the camera recording function may be realised by firmware implementation, being a combination of software acting upon specific hardware. This hardware operation may be supported by the camera API for remote control. This may mean that any attempt to turn on the recording function on the camera 210 will trigger the display of warning messages on the or each interactive display device 1101 to confirm the operation.

In this disclosure, recording can activate only when the recording function is enabled. To check if the recording function should be enabled, the process 400 proceeds to step 420, where the respective device 1101 receives the workflow status of all devices in a critical device group operating as part of the multi-step video production. The workflow status information may be obtained via aforementioned peer-device communication. This for example involves communication of the status of the workflow indicator 808 amongst the devices of the group.

In one arrangement, as alluded to above, a subset of all interactive display devices is assigned to the critical device group before the video production commences, and that the critical device group is constant throughout the complete video production. In another arrangement, the critical device group is updated dynamically according to the operations and roles of each individual using a corresponding interactive display device 1101. This will be detailed with reference to FIG. 5.

The process 400 then proceeds to step 430 where the corresponding processor 1105 determines, in a preferred implementation, whether all devices in the critical device group have moved to the recording step. If not, the process 400 returns to step 420 to again check the workflow status of all devices in the critical device group. If step 430 determines that all devices in the critical device group have moved to the recording step, then the process 400 proceeds to step 440 where the recording function is be enabled. The recording step is a step in the multi-step video production workflow, and covers the duration which starts from when all camera operators are ready for recording a take, and ends when the video camera 210 concludes the recording. One example is the performing camera action indication 812 as shown as part of the workflow indicator 808 in FIG. 8A. Where all devices in the critical device group have moved to the recording step, then all of them are ready for video capturing.

In an alternate implementation, step 440 can operate to present the recording function in the enable state in each of the camera 210 and at least one interactive display devices of the critical group, but not necessarily all devices of the critical group. This provides for actuation of recording either directly at the camera 210, or at the at least one interactive display device 1101. Such an approach may be suitable where only a senior camera operator has authority to activate recording. Nevertheless, that senior camera operator must await all devices and corresponding operators in the critical group moving to and thus being ready for the recording step of the workflow.

To determine if a device have moved to the recording step, different user interface control may be employed. In one implementation, a tab view may be used as a workflow indicator. As shown in FIG. 8A, an active tab (e.g. 810) indicates the current step in the workflow 808. A device 1101 has moved to the recording step if the active tab is associated with the recording step (i.e. 812). In another implementation, checklist may be used to facilitate the workflow indication. The checklist may contain a list of steps which need to be performed before recording starts, for example, 'sound check', 'lighting check', 'camera settings check', etc. Once the device operator finishes one step, he/she ticks the corresponding step in the checklist as represented in the relevant GUI reproduced on the touch panel 1114. The operator may not proceed to the next stage in the workflow until he/she finishes all the prerequisite steps have been ticked. In this case, the first unchecked step means the current step. In yet another implementation, a designated button in the GUI may be used to indicate the recording step. The device operator can actuate (press) the button to signal the reach of recording step.

The determination of whether all devices 1101 (220,230, 240) of the critical device group have moved to the recording step may rely on the peer-device communication. In one arrangement, the webserver 260 connected to the network 250 is configured with the IP address of all critical devices (e.g. 220,230,240) and the webserver 260 polls the critical devices at a regular time interval. With this action, the webserver 260 can determines if all critical devices have moved to the recording step by marking rolls of them.

The recording function is then enabled at step 440. In one implementation, the recording function is presented in an enabled state on all interactive display devices of the critical device group. In another implementation, the enabling of camera recording function may be supported by the firmware in the camera 210 and also the API of the camera 210. Any attempt to activate the recording when the API is disabled will trigger warning messages.

With step 440 implemented, the workflow process 400 ends. Once the recording function is enabled, all devices from the critical device group can further be notified via communications over the network 250 about their collective readiness.

For example, part of the underlying process of the application 1133 may involve each interactive display device 1101 broadcasting to all other devices in the system 299 an individual status of that device 1101 so all other devices can identify who is ready for the next step in the workflow, and most importantly, recording. Where the system 299 includes the server 260, the general broadcast may be substituted by a message to the server 260, or a polling operation of the server 260 to each interactive display device 1101, so that the server 260 can issue a list of status of all devices in the system 299.

Figure 8B:
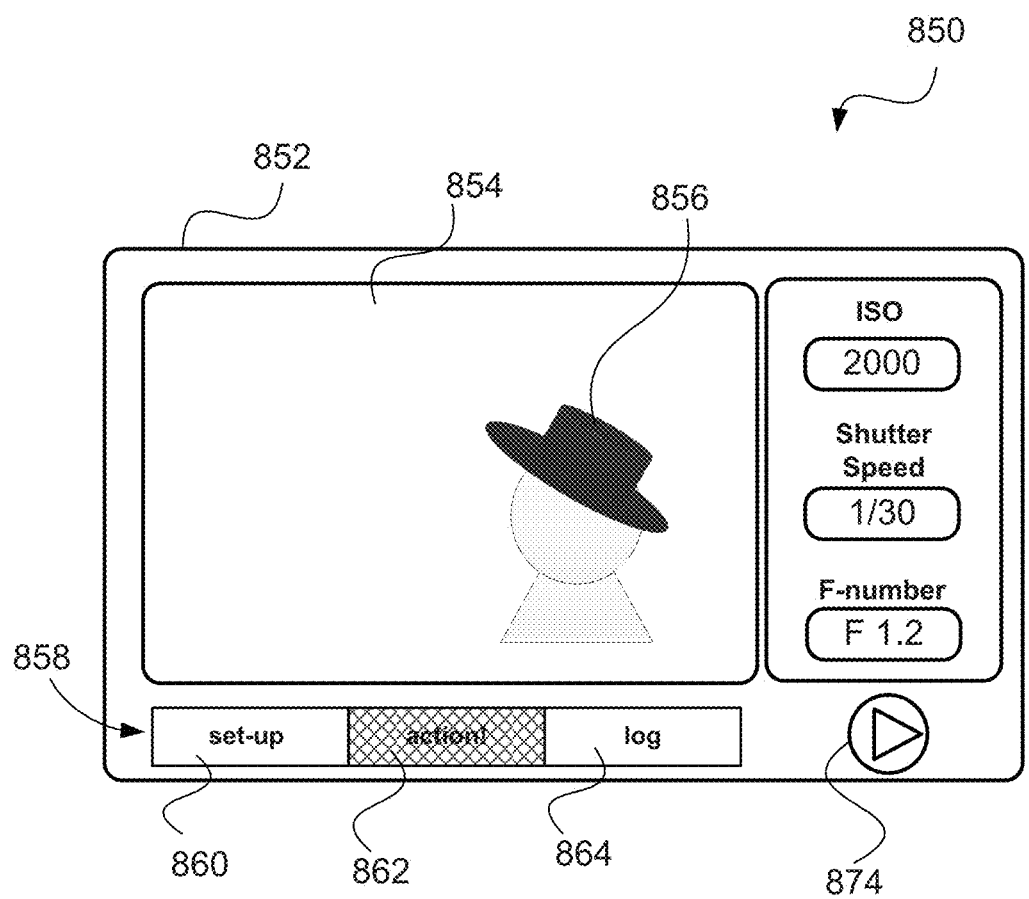
FIG. 8B depicts a user interface for an interactive mobile device with enabled recording function.

FIG. 8B shows the user interface 852 for one of the interactive display devices 850 (e.g. 220, 230, 240) associated with the video camera 210. FIG. 8B is similar to FIG. 8A in that corresponding features are labelled with corresponding reference numbers increased by 50. As demonstrated in FIG. 8B, the device operator has moved to the recording step since the action tab 862 is now the active tab (indicated by highlighting) in the workflow indicator 858. In addition, the recording button 874 is presented in an enabled state (e.g. with no transparency) within the GUI 852. This is due to that all devices in the critical device group have moved to the camera action step 862. FIG. 8B shows that the device 850 belongs to the critical device group, as the video recording can be activated by actuating (touching) the enabled record button 874.

Dynamic Critical Device Group Update

The critical device group may be considered as a bottleneck in the multi-step video production workflow, as the recording function of the camera 210 is enabled only when all devices in the critical device group have entered the recording step. On one hand, the critical device group ensures the availability of all member devices critical device group members when the recording starts. On the other hand, the critical device group may result in the delay caused by the absence or unavailability of certain devices, or the corresponding operator. This may result in a problem in the case of constant critical device group throughout the video production. Accordingly, where a device is not available for a particular video shooting, then that device should be demoted from the critical device group. An approach to the dynamic updating of critical devices is described with reference to FIG. 5.

Figure 5:
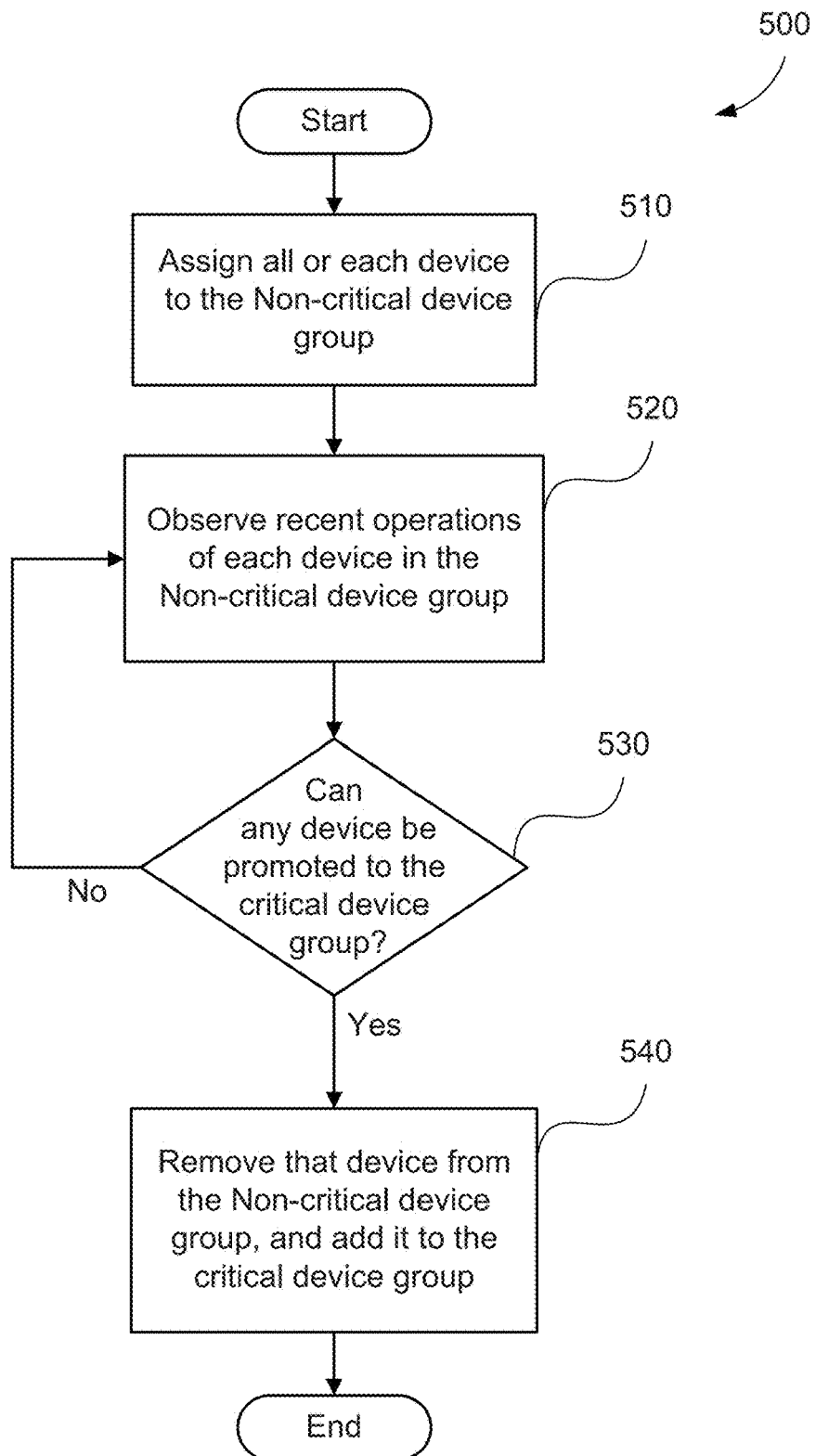
FIG. 5 is a flowchart of a process of updating the critical device group based on each device operator's recent camera operations.

FIG. 5 shows a process 500 for the updating of a critical device group based on the recent camera operations of each device. The process 500 provides flexibility in determining the critical device group. The process 500 is typically performed in the multi-step video production workflow on conclusion of the performing camera action step 812, or on entry to either the log review step 814 or the set-up step 801, thereby taking advantage the time between individual takes or shots. Typically, the process 500 is performed in software as part of the application 1133 executable on each of the interactive display devices 1101 (220-240). Alternatively, where provided, the process 500 may be performed by the server computer 260 to interact with all interactive display devices 1101 active within the system 299.

All interactive display devices 1101 that may be used on a film set, and thus interconnected via the network 250, may be divided into at least two groups, including a non-critical device group, and a critical device group. These groups are mutually exclusive. The process 500 starts at step 510, where the individual device 1101 assigns itself to the non-critical device group, or the server 260 assigns all devices 1101 (e.g. 220, 230, 240) to the non-critical group. The critical device group is thus initially empty on conclusion of step 510.

The individual interactive display device 1101 or server computer 260 then continuously runs a process of observing recent or previous operations of the or each interactive display device member of the non-critical device group at step 520. Such operations are referred to as promoting operations as they demonstrate intentions to participate in the shooting of a new take. The operations may include, but are not limited to, camera operations, slating operations, and reviewing operations. These promoting operations are observed by the interactive display device 1101 or server computer 260 and buffered to a memory thereof so that there is a history for a predetermined time window for each device of the non-critical device group.

The camera operations involves operations that may affect the visual quality of the recording, and may include, but are not limited to: reducing/enlarging camera aperture; modifying camera shutter speed; modulating camera ISO; setting camera focusing point; adjusting camera focusing stops; changing camera autofocusing mode; updating camera white balance; altering camera frame rate, etc. Slating operations are operations that are associated with film slating (often performed with a clapperboard). Slating operations may include but are not limited to: entering/changing a slate number; updating/adding roll numbers, setting/altering scene numbers etc. Reviewing operations are associated with operations that may lead to change of camera settings. Reviewing operations may include, but are not limited to: activating video scopes; switching video scope types; zooming in/out the video scopes; turning on focus peaking, etc.

If any promoting operation has been observed in the "recent" time window from a particular interactive display device as determined at step 530, that particular device is then promoted to the critical device group at step 540. Step 540 also causes the server computer to remove the particular device from the non-critical device group to ensure mutual exclusion between the two groups.

As noted above, in a preferred implementation the recent time window is that immediately after the action step 812 or on commencement of the setup step 810 of the workflow 808. For example, those operators manipulating camera controls during the setup step 810 would be identified as critical for camera operation and thus the corresponding devices would be elevated by assignment to the critical device group. Others, for example reviewing the previous shot, would remain in the non-critical group(s).

In an alternate implementation, in step 520, "recent" operations are those that fall within a time window preceding the particular instance of step 520. The time window may be predetermined such as fixed in units of time (e.g. 30 minutes, 2 hours), or filming units, such as the last 5 takes, or the last 3 scenes (regardless of the number of takes for each of those scenes). The time window may also be dynamically adjusted according to rules drawing contributions from, for example, predetermined time periods, the progress of filming (rate of takes, or scene completion). The determination of the time window should desirably be arranged so that only those devices required for critical operations and perhaps some redundancy are promoted into the critical device group.

If no promoting operations are observed at steps 520 and 530, the process 500 proceeds back to step 520 to observe operations in an updated time window.

Figure 9A:
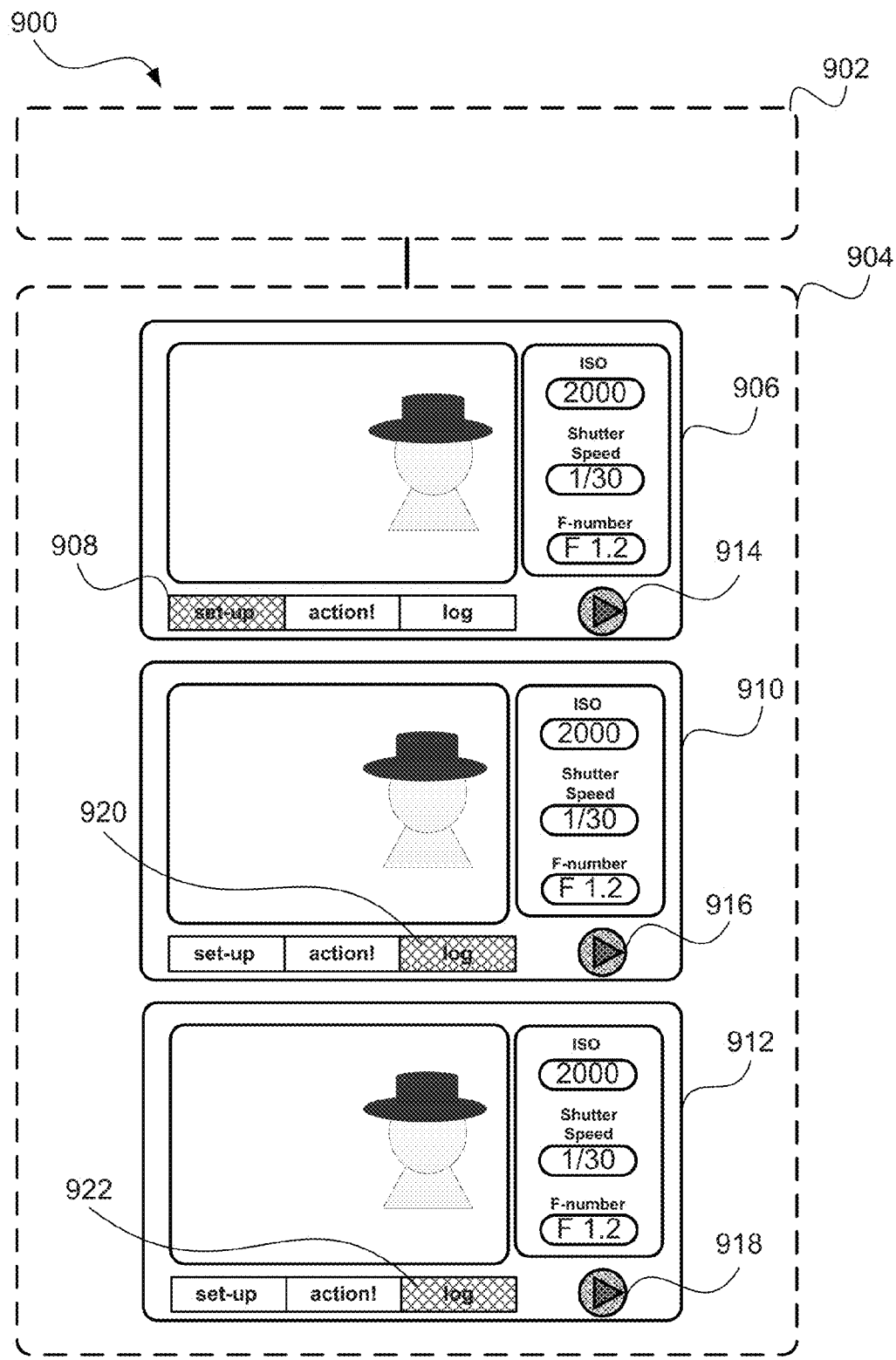
FIGS. 9A and 9B collectively show an example of camera operator group updates for an interactive mobile device.
Figure 9B:
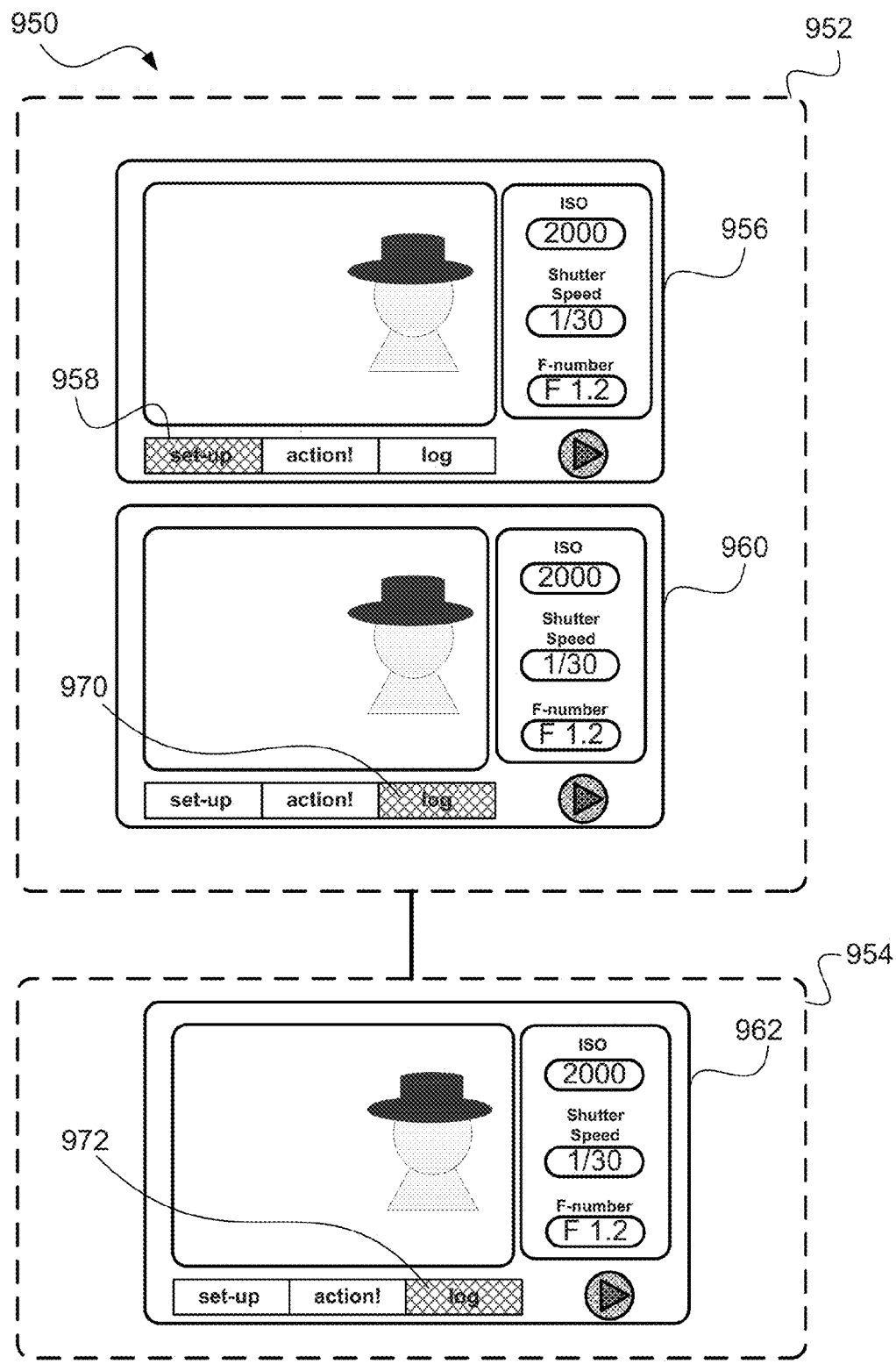

FIGS. 9A and 9B collectively illustrate an example of critical device group updates using the approach of FIG. 5. FIG. 9A shows the scenario 900 where the critical device group is initially empty. There are two device groups in FIG. 9A, namely the critical device group 902, and the non-critical device group 904. Since the critical device group 902 is empty, all devices are assigned to the non-critical group 904. As shown by FIG. 9A, there are three devices in the group 904, with each being operated in a corresponding step of the video production workflow. For example, device 906 is at the set-up step 908, whereas devices 910 and 912 are each at the logging step 920, 922. All of the corresponding recording buttons 914, 916, and 918 are presented as disabled (as transparent icons in the respective GUIs) since the critical device group 902 contains no devices.

Following the settings depicted in FIG. 9A, the device operators assigned to the interactive display devices 906 and 910 manipulate the camera settings within a predefined time window. As a result, both devices 906 and 910 are promoted to the critical device group 902.

FIG. 9B exemplifies the scenario 950 for both the non-critical device group 904 and the critical device group 902 after the update. FIG. 9B is similar to FIG. 9A in that corresponding features are labelled with corresponding reference numbers increased by 50. As portrayed in FIG. 9B, the critical group 952 currently contains two devices, namely 956 and 960. In comparison with FIG. 9A, there is only one device 962 left in the non-critical device group 954 after the update.

Workflow Synchronisation

Figure 6:
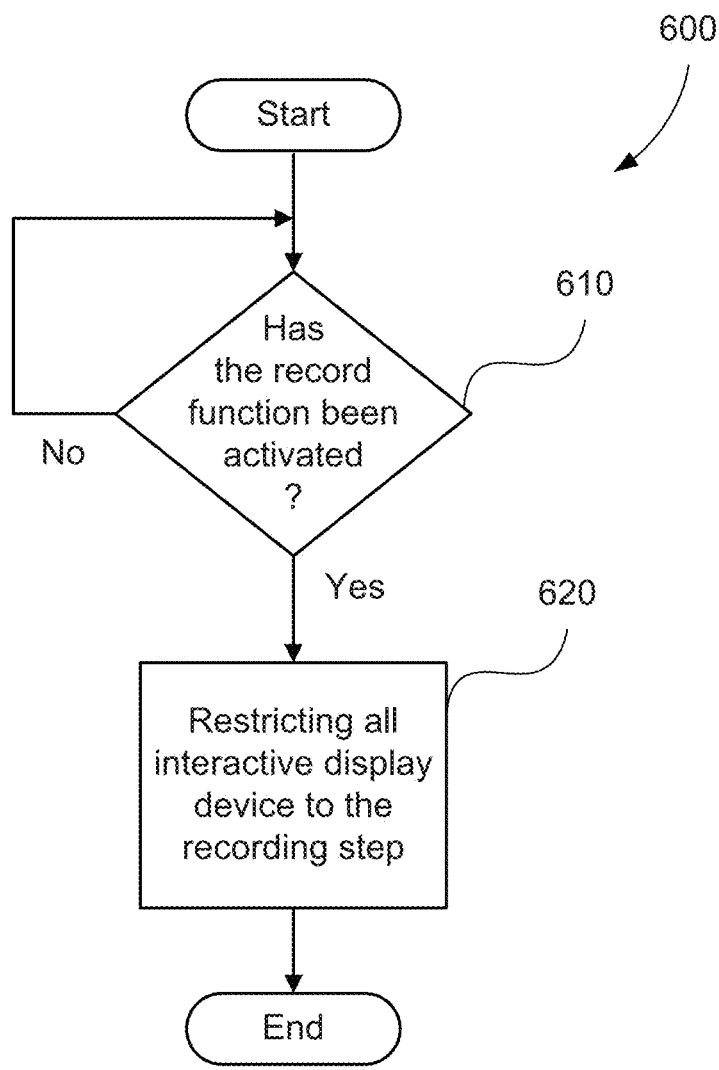
FIG. 6 is a flowchart of a process of restricting a multi-step video production workflow across multiple interactive mobile devices.
Figure 7:
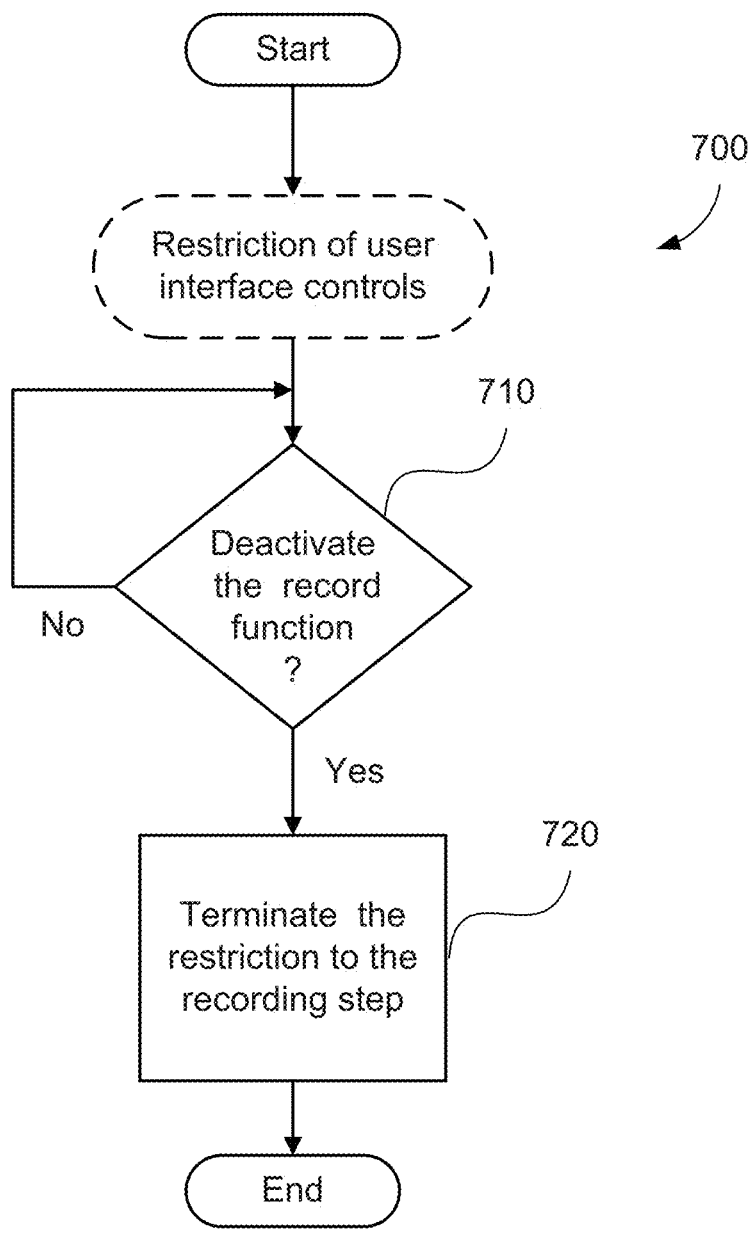
FIG. 7 is a flowchart of a process by which the system terminates the synchronisation of a multi-step video production workflow synchronisation.

As soon as the recording function on the camera 210 has been enabled in step 440 in FIG. 4, the system 299 is ready for the video production workflow synchronisation. FIG. 6 demonstrates a process 600 of synchronising a multi-step video production workflow across multiple interactive display devices. The process 600 is typically performed in software and executed by each interactive display device 220-240 of the system 299. In some implementations, the process 600 may be performed by the server 260 which then asserts commands to the interactive display devices connected to the network 250.

The recording function has been placed in an enabled state prior to the process 600 as discussed above, and the recording function can be activated by any device inside the critical device group, or at the camera 210 directly. In an initial step 610, the device 1101 or server 260 checks if the recording function has been activated. In one approach, the server 260 may poll the camera 210 to check the activation of the recording function at a regular time interval. In another approach, the server 260 or the interactive display device 1101 may receive an event notification from the camera 210 when the recording function is activated.

The activation may be implemented in two ways. In one implementation, each device 1101 that is a member of the critical device group can issue a start-recording request to the video camera 210, for example by a corresponding operator pressing the button 874, which then activates the recording. In another implementation, one operator of a device 1101 from the critical device group can manually press the recording button on the camera 210. If no activation of the recording function has been detected, the process 600 returns to the checking process at step 610.

If the recording function has been activated, the process 600 then proceeds to step 620, in which all interactive display devices participating in the workflow, not just that are part of the critical device group, are restricted to the recording step. The motivation is to notify all devices that the recording is in progress by showing the recording interface across all interactive display devices.

The restriction may be applied on the interactive display devices. In one arrangement, step 620 involves switching the user interface of all interactive mobile devices to reproduce video of the recording scene. In the meantime the user interface controls of all devices are limited to only the video viewing, thereby to ensure the attention of all concerned is focussed on the recording scene. This can be achieved by disabling at least one user interface control of each of the interactive display devices. In this case none of the devices can navigate to the next step of the multi-step production workflow during the course of video recording. Functions which are disabled may include video playback, adjustment of camera settings (ISO values, shutter speed, aperture sizes, and colour temperature), navigation in the workflow tab, etc. This means that none of the devices can navigate to a screen where they can playback film. In another arrangement, the user interface displays the recording scene while the other interface controls are disabled. For example, the workflow tab indicator may be disabled to prevent any device from navigating to the next step, either purposively or accidentally. The restrictions on the user interface controls apply to both the non-critical device group and the critical device group. None of the device operators can proceed to the next step before the current recording accomplishes.

The restriction may also be applied on the camera 210. In one implementation, the camera 210 may be restricted by limiting some of its functions, such as the ability of adjusting camera lens (which may not be desired in some situations), modifying camera parameters, etc.

Note that before the execution of step 620, devices other than those in the critical device group may be at different steps of the video production workflow. Some such devices may be reviewing takes from previous video production on the corresponding interactive display GUI of the touch panel 1114, which means that those devices are at the post-recording step. Some devices may be adjusting camera settings, which indicates that they are at the before-recording (set-up) step. Regardless of the step at which each device is performing, each of the devices is desirably taken or otherwise advanced and restricted to the recording step in step 620.

Figure 10:
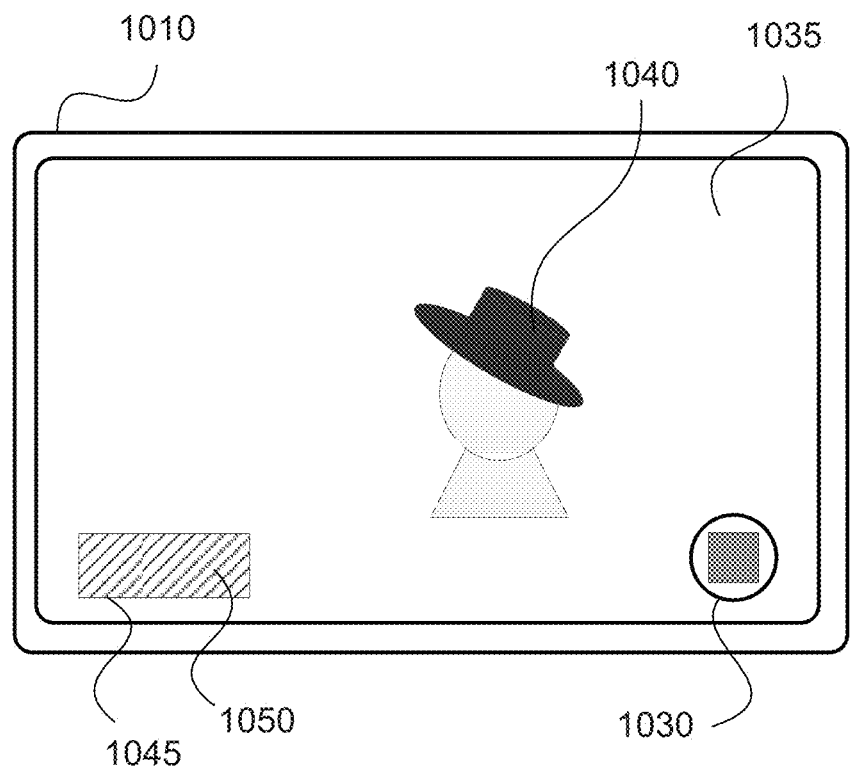
FIG. 10 shows an example of the user interface for the interactive mobile devices during the multi-step video production workflow synchronisation.

FIG. 10 depicts an example of the user interface 1010 for all of the interactive display devices of the system 299 during the restriction of all devices to the recording step as occurs in step 620. As illustrated in FIG. 10, the GUI 1010 is representative of one of the interactive display devices (e.g. 220, 230, 240) associated with the video camera 210. The device via the GUI 1010 is currently restricted for the recording, as the live view screen 1035 occupies most of the display panel 1114. The live view screen 1035 reproduces a representation of a man wearing a hat 1040 and a stop button 1030 which indicates the recording is in progress. It is noted that the stop button 1030 is only enabled for devices in the critical device group, which means only those devices in the critical group can deactivate the recording by the corresponding operator actuating the stop button 1030. All the interactive display devices now share the same display, regardless whether the device is in the critical device group or the non-critical device group. Due to the preferred restriction of display, no device can change the display of recording, or navigate to the next step in the workflow. The change of the display and the navigation is possible only when the recording terminates.

Displaying Role-Specific Content

The system 299 may desirably operate to display role-specific content on the interactive display devices during the restricted displaying period of those devices. This may apply to all devices from both the non-critical and critical groups.

The goal of displaying role-specific content is to remind device operators of certain operations before the workflow synchronisation occurs. This type of content may be displayed in a small area 1045 superimposed on the recording screen 1035 during the video recording, as shown in FIG. 10. The additional information 1050 displayed is related to operations that the device corresponding to the GUI 1010 was performing before the workflow synchronisation commenced. Examples of such visual content may include, but are not limited, to a display of the take reviewed before the recording commenced (useful for script supervisors), a summary display of camera settings before the recording commenced (useful for camera operators), a display of the video scopes (useful for cinematographers), sound level displays of different actors (useful for sound engineers), etc. This enables individual operators to revert back the previously performed task upon conclusion of the recording operation. The content 1050 of the window 1045 may include a brief system generated summary of the previous screen, or a partial screenshot of the previous screen for that device operator, generally sufficient to remind that operator of the task being performed immediately before the recording of video. In FIG. 10, the stop button 1030 is depicted in an "enabled" state (as opposed to transparent for disabled), indicating that the specific interactive display device reproducing the GUI 1010 is related to the critical device group of a camera operator, Where the relevant device is not a member of the critical device group, the stop button need not be displayed, or at least would be disabled and indicated as such by a transparency effect.

Post Synchronisation

When the recording is drawing to an end, the system 299 prepares for terminating the workflow synchronisation. FIG.

7 shows the process 700 by which the system 299 terminates the synchronisation of a multi-step video production workflow. Typically, the process 700 may form part of the application 1133 and is executed by each of the interactive display devices of the system 299. Alternatively the process 700 is performed in software executed by the server 260 in communication with each of the devices 220,230,240. The process 700 initially operates with the state of restriction of all user interface control of all interactive display devices, this having been established in step 620. The server 260 or device 1101 then continuously executes step 710 to check if any deactivate-recording command has been received. The deactivate-recording command may be issued in two ways. Firstly, one camera operator in the critical device group may interact with the associated interactive display device to send a deactivate-recording request to the camera 210. The camera 210 then receives the request from the network 250 and operates to stop the recording. In addition, one operator of the device from the critical device group can manually stop the recording by pressing the record button on the camera 210. If no such command has been received, the process 700 returns back to step 710 to observe any following commands.

If a deactivate-recording command is detected or received in step 710, the process 700 then proceeds to step 720. Step 720 operates to terminate the synchronisation of all user interface control of all devices. Where the process 700 is executed by the server 260, this may involve sending a command to all of the interactive display devices 1101 (220-240). Where the process 700 is implemented by each device 1101, such may be effected by simple termination of synchronisation, thereby enable local control of the corresponding device. The restriction on all interactive display devices 1101 will be terminated. All device operators will be able to use the full set of user interface control on the corresponding interactive display device. The termination of synchronisation also means that those devices are able to navigate to the next step in the workflow.

For example, the director can start reviewing the freshly-recorded take. In one implementation, previous screens that had been reproduced immediately before the activation of recording can be resumed. This is useful to operators for devices in the non-critical device group as they can continue their work before the activation of recording. In another implementation, all post-synchronisation screens can remain the same, so that each device operator may decide which screen or what workflow step may be selected.

INDUSTRIAL APPLICABILITY

The arrangements described are applicable to the computer and data processing industries and particularly for the production of video films video where synchronism between multiple persons and system components is desired.

The foregoing describes only some embodiments of the present invention, and modifications and/or changes can be made thereto without departing from the scope and spirit of the invention, the embodiments being illustrative and not restrictive.

The invention claimed is:

1. A processor implementable method of synchronising a plurality of interactive display devices operating in accordance with a shared multi-step video production workflow, each of the plurality of interactive display devices being in communication with a video capture device, the method comprising:

assigning a subset of the plurality of the interactive display devices to a critical device group, each interactive display device in the critical device group being configured to control one or more operational parameters of the video capture device, and to perform such control in response to a received instruction;

determining that each interactive display device in the critical device group has entered a recording enabled state in which the interactive display device can activate a recording function of the video capture device, and, in response to the determination, enabling a recording function of the video capture device to be activated by one or more of a group comprising: the video capture device and the interactive display devices in the critical device group; and disabling at least one user interface control in each of the plurality of interactive display devices in response to an activation of the recording function, wherein the at least one user interface control remains disabled in each of the plurality of interactive display devices, until such time as the recording function is deactivated.

2. The processor implementable method according to claim 1, further comprising upon activation of the recording function, restricting each of the plurality of interactive display devices to the recording step in the shared multi-step video production workflow.

3. The processor implementable method according to claim 1, wherein upon each interactive display device in the critical device group entering the recording enabled state, presenting an enabled recording function at one or more of a group comprising: the video capture device and the interactive display devices in the critical device group.

4. The processor implementable method according to claim 2, further comprising advancing a remainder of the plurality of interactive recording devices that are not in the recording step enabled state immediately before the activation, to the recording enabled state in the shared multi-step video production workflow.

5. The processor implementable method according to claim 1, wherein an interactive display device is assigned to the critical device group based on previous operations of the interactive display device.

6. The processor implementable method according to claim 5, wherein the assigning comprises assigning all interactive display devices to a non-critical device group and observing recent operations of each device in the non-critical device group to determine if a device can be assigned to the critical device group and upon such determination, removing the determined device from the non-critical device group and assigning the determined device to the critical device group.

7. The processor implementable method according to claim 1, further comprising displaying information content on the interactive display devices during activation of the recording function, the displayed information content being related to a role associated with the corresponding interactive display device.

8. The processor implementable method according to claim 7, wherein the displayed information is related to the role performed by the interactive display device immediately before commencement of the recording function.

9. The processor implementable method according to claim 1, wherein the determining that each interactive display device in the critical device group has entered the recording enabled state comprises checking a user interface control selected from a group consisting of a tab view, buttons, and a checklist.

10. The processor implementable method according to claim 1, wherein the disabling further comprises restricting a user interface of the camera during the activation of the recording function.

11. The processor implementable method according to claim 1, further comprising polling a status of the camera to determine the activation of the recording function.

12. The processor implementable method according to claim 1, further comprising determining the activation of the recording function by receiving event notification from the camera.

13. An interactive display device comprising a processor, a memory coupled to the processor and including a program executable by the processor, and an interactive display arrangement, the program comprising code for performing a method of synchronising the interactive display device with at least one other interactive display device, each interactive display device operating in accordance with a shared multi-step video production workflow and being in communication with a video capture device, the method comprising:
  assigning a subset of the interactive display devices to a critical device group, each interactive display device in the critical device group being configured to control one or more operational parameters of the video capture device, and to perform such control in response to a received instruction;
  determining that each interactive display device in the critical device group has entered a recording enabled state in which the interactive display device can activate a recording function of the video capture device and, in response to the determination, enabling a recording function of the video capture device to be activated by one or more of a group comprising: the video capture device and the interactive display device in the critical device group; and
  disabling at least one user interface control in the interactive display arrangement of each of the interactive display devices in response to an activation of the recording function, wherein the at least one user interface control remains disabled in each of the interactive display devices to thereby restrict each of the interactive display devices to the recording enabled state until such time as the recording function is deactivated.

14. The interactive display device according to claim 13 wherein the interactive display device comprises the video capture device.

15. A non-transitory computer readable storage medium having a program stored thereon, the program being executable to synchronise a plurality of interactive display devices operating in accordance with a shared multi-step video production workflow, each of the plurality of interactive display devices being in communication with a video capture device, the program comprising:
  code for assigning a subset of the plurality of interactive display devices to a critical device group, each interactive display device in the critical device group being configure to control one or more operational parameters of the video capture device, and to perform such control in response to a received instruction;
  code for determining that each interactive display device in the critical device group has entered a recording enabled state in which the interactive display device can activate a recording function of the video capturing device and, in response to the determination, enabling a recording function of the video capture device to be activated by one or more of a group comprising: the video capture device and the interactive display devices in the critical device group; and
  code for disabling at least one user interface control in each of the plurality of interactive display devices in response to an activation of the recording function, wherein the at least one user interface control remains disabled in each of the plurality of interactive display devices, to thereby restrict each of the plurality of interactive display devices to the recording step in the shared multi-step video production workflow until such time as the recording function is deactivated.

16. The non-transitory computer readable storage medium according to claim 15, further comprising code, operative upon activation of the recording function, to restrict each of the plurality of interactive display devices to the recording enable state, and further comprising code for advancing a remainder of the plurality of interactive recording devices that are not in the recording enabled state immediately before the activation to the recording enabled state.

17. The non-transitory computer readable storage medium according to claim 15, wherein an interactive display device is assigned to the critical device group based on previous operations of the interactive display device, and the code for assigning comprises code for assigning all interactive display devices to a non-critical device group and observing recent operations of each device in the non-critical device group to determine if a device can be assigned to the critical device group and upon such assignment, removing the assigned device assigned to the critical device group from the non-critical device group.

18. The non-transitory computer readable storage medium according to claim 15, further comprising code for displaying information content on the interactive display devices during activation of the recording function, the displayed information content being related to a role associated with the corresponding interactive display device, the displayed information is related to the role performed by the interactive display device immediately before commencement of the recording function.

19. The non-transitory computer readable storage medium according to claim 15, wherein the code for determining that each interactive display device in the critical device group has entered the recording enabled state comprises code for checking a user interface control selected from the group consisting of a tab view, buttons, and a checklist.

20. The non-transitory computer readable storage medium according to claim 14, wherein the code for disabling further comprises code for restricting a user interface of the camera during the activation of the record function.

21. The non-transitory computer readable storage medium according to claim 15, further comprising one of:
  code for polling a status of the camera to determine the activation of the recording function; and
  code for determining the activation of the recording function by receiving event notification from the camera.

22. A system comprising:
  a communications network;
  a video capture device coupled to the communications network;
  a plurality of interactive display devices each coupled to the communications network and operating in accordance with a shared multi-step video production workflow, each of the plurality of interactive display devices being in communication with the video capture device, the system being operable to:

assign a subset of the plurality of the interactive display devices to a critical device group, each interactive display device in the critical device group being configured to control one or more operational parameters of the video capture device, and to perform such control in response to a received instruction;

determine that each interactive display device in the critical device group has entered a recording enabled state in which the interface display device can activate a recording function of the video capture device, and, in response to the determination, enabling a recording function of the video capture device to be activated by one or more of a group comprising: the video capture device and the interactive display device in the critical device group; and disable at least one user interface control in each of the plurality of interactive display devices in response to an activation of the recording function, wherein the at least one user interface control remains disabled in each of the plurality of interactive display devices, to thereby restrict each of the plurality of interactive display devices to the recording step in the shared multi-step video production workflow until such time as the recording function is deactivated.

* * * * *